(12) United States Patent
Smith

(10) Patent No.: US 10,575,330 B2
(45) Date of Patent: *Feb. 25, 2020

(54) DYNAMIC CONTROL FOR WIRELESS DEVICES

(71) Applicant: Graham Alxander Smith, El Dorado Hills, CA (US)

(72) Inventor: Graham Alxander Smith, El Dorado Hills, CA (US)

(73) Assignee: DSP Group Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,106

(22) Filed: Jan. 31, 2017

(65) Prior Publication Data

US 2017/0208628 A1   Jul. 20, 2017

Related U.S. Application Data

(63) Continuation of application No. 14/283,319, filed on May 21, 2014, now Pat. No. 9,596,702.

(51) Int. Cl.
| | |
|---|---|
| *H04W 74/08* | (2009.01) |
| *H04W 24/00* | (2009.01) |
| *H04W 16/20* | (2009.01) |
| *H04W 40/02* | (2009.01) |
| *H04B 17/318* | (2015.01) |
| *H04W 88/08* | (2009.01) |

(52) U.S. Cl.
CPC ...... *H04W 74/0816* (2013.01); *H04B 17/318* (2015.01); *H04W 16/20* (2013.01); *H04W 24/00* (2013.01); *H04W 40/02* (2013.01); *H04W 74/085* (2013.01); *H04W 74/0825* (2013.01); *H04W 88/08* (2013.01)

(58) Field of Classification Search
CPC .............................. H04W 16/20; H04W 24/00
See application file for complete search history.

(56) References Cited

U.S. PATENT DOCUMENTS

| | | | | |
|---|---|---|---|---|
| 6,169,761 | B1* | 1/2001 | Marcoccia | H04B 1/7156 375/132 |
| 2004/0146013 | A1* | 7/2004 | Song | H04B 7/15507 370/279 |
| 2005/0058151 | A1* | 3/2005 | Yeh | H04W 52/46 370/445 |
| 2007/0082677 | A1* | 4/2007 | Donald Hart | H04W 16/18 455/456.1 |
| 2009/0012738 | A1* | 1/2009 | Hart | H04W 16/20 702/127 |
| 2011/0188391 | A1* | 8/2011 | Sella | H04W 24/10 370/252 |
| 2012/0309376 | A1* | 12/2012 | Huang | H04M 1/72572 455/418 |
| 2014/0233443 | A1* | 8/2014 | Kumar | H04L 12/12 370/311 |

(Continued)

*Primary Examiner* — Raj Jain
(74) *Attorney, Agent, or Firm* — Reches Patents

(57) ABSTRACT

A method for determining an attribute of a carrier sense multiple access with collision avoidance (CSMA/CA) scheme, the method may include receiving, by an interface of a wireless communication device, an input signal; calculating, by a processor of the wireless communication device, a strength of the input signal; and determining, by the processor, the attribute of the (CSMA/CA) scheme in response to the strength of the input signal.

26 Claims, 18 Drawing Sheets

(56) References Cited

U.S. PATENT DOCUMENTS

2014/0376453 A1* 12/2014 Smith ............... H04W 74/0816
370/328
2015/0110051 A1* 4/2015 Azizi ..................... C12N 15/74
370/329

* cited by examiner

PRIOR ART

|  |  |  | −80dBm | −77dBm | −68dBm | −77dBm | −80dBm |  |  |
|---|---|---|---|---|---|---|---|---|---|
|  |  | −83dBm | −72dBm | −60dBm | −48dBm | −60dBm | −72dBm | −83dBm |  |
|  | −82dBm | −69dBm | −55dBm | −40dBm | (−38dBm) | −40dBm | −55dBm | −69dBm | −82dBm |
|  |  | −83dBm | −72dBm | −60dBm | −48dBm | −60dBm | −72dBm | −83dBm |  |
|  |  |  | −80dBm | −77dBm | −68dBm | −77dBm | −80dBm |  |  |

Home apartment 41

Monitoring a lack of reception of input frames that were expected to be received by the wireless communication device. 851

Updating the attribute of the collision avoidance scheme in response to the lack of reception of input frames that were expected to be received by the wireless communication device. 852

Reducing the receive sensitivity threshold and effective clear channel assessment threshold upon a lack of reception of a predetermined number of successive beacon frames that were expected to be received by the wireless communication device. 853

Reducing the receive sensitivity threshold and effective clear channel assessment threshold upon a predefined relationship between beacon frames that were received by the wireless communication device and beacon frames that were expected to be received by the wireless communication device but were not received by the wireless communication device. 854

Reducing, by a certain amount, the receive sensitivity threshold and effective clear channel assessment threshold upon a lack of reception of at least one input frame that was expected to be received by the wireless communication device; wherein the certain amount is fixed. 855

Reducing, by a certain amount, the receive sensitivity threshold and effective clear channel assessment threshold upon a lack of reception of at least one input frame that was expected to be received by the wireless communication device; wherein the certain amount varies over time. 856

Measuring, by a wireless communication device, an attribute of transmissions of another wireless communication device. 910

Determining the attribute of the collision avoidance scheme in response to an attribute of the transmissions of the other wireless communication device. 920

Transmitting the attribute of the collision avoidance scheme to a further wireless communication device. 930

DYNAMIC CONTROL FOR WIRELESS DEVICES

RELATED APPLICATIONS

This application is a continuation of U.S. patent application Ser. No. 14/283,319 filing date May 21, 2014 that claims priority from U.S. provisional patent Ser. No. 61/836,681 filing date Jun. 19, 2013, both applications being incorporated herein by reference.

FIELD OF THE INVENTION

This invention relates to the field of wireless local area networks.

BACKGROUND OF THE INVENTION

In a wireless network that uses carrier sense multiple access with collision avoidance, CSMA/CA, as its basic access mechanism a receiving station listens to the wireless medium before transmitting, and if the medium is busy, it will not transmit but will wait until the medium is clear. This is so as to avoid collisions in the medium. An example of such a wireless network is one that is based upon the IEEE 802.11 standard, commonly known as Wi-Fi. To meet this requirement a receiving station commonly has two methods of sensing the medium: physical carrier sense and virtual carrier sense. The physical carrier sense senses that there is radio frequency activity above a certain threshold whereas the virtual carrier sense decodes the received transmission and detects a value that is contained in the transmitted signal that is known in the IEEE 802.11 standard as the network allocation vector, NAV. The NAV is a value that indicates to all stations that receive the signal the time that remains before the medium will become free again after the transmitted packet has ended. In the case of a single packet transmission, the NAV allows time for that packet to be acknowledged. The physical and virtual carrier sense mechanisms in practice exert an indication to the station that informs the station that it shall not transmit. This indication is generally known as clear channel assessment, CCA. Hence, if CCA is exerted in a station, then that station will not transmit. IEEE802.11-2007 and all previous versions, specify the received signal levels for CCA to be exerted for any valid signal and for any radio frequency energy level detected. These levels are known as the CS/CCA (carrier sense CCA) threshold and ED-CCA (energy detect CCA) threshold respectively. For example, in general, for 20 MHz channels, any valid signal detected at or greater than −82 dBm shall exert CCA, and any energy level detected at or greater than −62 dBm shall also exert ED-CCA. The figure of −82 dBm is based upon the specified minimum modulation and coding rate sensitivity. The sensitivity threshold of a station can also determine the CCA threshold. If the receive sensitivity threshold of a station is higher than the CS/CCA threshold, for example, the effective CS/CCA threshold will be the receive sensitivity threshold.

A simplified block schematic diagram of the receiver section 10 of a station that uses CSMA/CA is shown in FIG. 1.

The radio frequency signal received at the antenna 11 is amplified by amplifier (such as low noise amplifier LNA) 12 and then converted to digital form by analog to digital converter (ADC) 13. After being mixed by mixer 14 to convert the received frequency to the baseband frequency, the signal is applied to the digital front end block 15. The processes carried out in this digital front end block 15 include amplification by a digital amplifier (digital Amp) 16, applying an automatic gain control scheme by automatic gain controller (AGC) 18, undergo an input signal attribute measurement such as a received signal strength indicator (RSSI) measurement by RSSI module 19, and signal detected by signal detector 17. Note that there is a direct relationship between RSSI and the received signal strength. AGC 18 will measure the radio frequency, RF, energy level detected.

The RSSI indication is effectively a measurement of the received signal level of a valid received signal. The signal detect block will indicate that a received signal, greater than the received signal detect threshold has been received and will indicate that the medium is busy, or that CS/CCA or ED-CCA is exerted, and cause the received signal to be processed. Hence, the AGC 18 indicates the general RF energy detected, and the RSSI 19 indicates the received signal strength of a valid signal. The settings of the relevant thresholds are set using registers 20. The RSSI value is also written to a register which is then read by the medium access control, MAC, block 22. The processed signal from the digital front end 15 is demodulated by demodulator 23 and passed to the media access control (MAC) module 22.

There are three basic thresholds for the signal detector 17: receive sensitivity threshold, CS/CCA threshold and ED-CCA threshold.

The receive sensitivity threshold sets the level of the minimum sensitivity of the receiver, any signal, valid or not, that is at a level below this threshold will not be processed in any way, it is effectively lost or undetected.

The CS/CCA threshold is a value received by the signal detector 17 from the MAC module 22 and sets the level at which any valid signal that is received above this level will exert CCA and declare the medium busy.

ED-CCA threshold is a value received by the signal detect block from the MAC module 22 and sets the level at which any RF energy that is received above this level will exert ED-CCA and declare the medium busy.

As long as the receive sensitivity threshold is set to a level higher than the CCA threshold, then an RF signal that is received at less than this threshold would not be detected and hence the receive sensitivity threshold would also set the CCA threshold. For example, if the CS/CCA threshold is −82 dBm and the receive sensitivity threshold is set to −75 dBm, then the effective CS/CCA threshold would also be −75 dBm irrespective if the CS/CCA threshold was set to −82 dBm. Also, if the CS/CCA threshold were set to −82 dBm, the ED-CCA threshold set to −62 dBm and the receive sensitivity threshold is set to, say −50 dBm, then the effective ED-CCA threshold would be −50 dBm.

Having a fixed CCA threshold can often result in a station being prevented from transmitting even when, in fact, it could transmit without causing any interference to the other station that is the cause of the CCA being exerted. To better explain this situation, four examples are given.

Example 1 is shown in FIG. 2. A station, STA A, 30, is located at a distance D from its own access point, AP1, 31 and another station, STA B, 33 in an overlapping network is located at a distance of 4D from AP1 31 and 2D from STA A, 30.

Indoor RF propagation loss for this type of indoor application can be assumed to be in the order of 10 dB per octave which is a distance factor of about 35 log(d), where d is the distance. Assume that at AP1 31 the signal strength from STA A 30 is −50 dBm. Then the signal strength from STA B 33 which is four times the distance away from AP1 31 than STA A 30, and behind a wall 35 that has a penetration loss of 10 dB, will be in the order of −80 dBm. Hence, with a difference of 30 dB in the relative signal strengths of STA A 30 and STA B 33, AP1 31 can receive a transmission from STA A 30 at the same time that STA B 33 is transmitting. The signal to noise plus interference ratio, SNIR, at AP1 31 is in the order of 30 dB, more than sufficient for good reception. Similarly, in this example, AP2 32 can receive a signal from STA B 33 while STA A 30 is transmitting. Note, however, that in this example, STA A 30 will receive a signal from STA B 33 at a level of about −66 dBm; therefore if the common specified value of −82 dBm is used for the CS/CCA threshold, if STA B 33 is transmitting then that signal from STA B 33 will exert CCA in STA A 30 and STA A 30 will not transmit. The point to be noticed is that in this example, both STA A 30 and STA B 33 could transmit at the same time and their respective access points, AP1 31 and AP2 32 would receive their respective signals without problem, but in order to do this, the CS/CCA threshold or receive sensitivity threshold would need to be set higher, say −60 dBm.

Example 2 is shown in FIG. 3. This example is for an apartment block 40 where any particular apartment is surrounded by other apartments on either side, above and below. The received signal strengths in the home apartment 41, from each surrounding apartment, can be estimated using an empirical formula for indoor propagation loss. Such a formula is that of Erceg et al, 2004, "TGn Channel Models", IEEE 802.11-03/940 r4. Calculated results for the received signal strengths in the home apartment 41 and the surrounding apartments are shown in FIG. 3. In this particular case the assumed apartment size is 20 by 35 feet. Note that, in this example, assuming a CS/CCA threshold of −82 dBm, a station in the selected home apartment 41 is subject to potential interference from 32 surrounding apartments.

In the 2.4 GHz band there are only three non-overlapping channels, and in the 5 GHz band there are about 20 channels of 20 MHz bandwidth and only 10 channels of 40 MHz bandwidth, depending on different areas of the world, hence the probability of overlap and interference is high. If, however, the CCA threshold or the receive sensitivity threshold were set to −50 dBm, then this would result in a station within the selected home apartment 41 being subject to possible interference from only 4 surrounding apartments, down from 32. Within the home apartment 41 the minimum signal strength is in the order of −38 dBm but note that the highest signal from any apartment other than the 4 immediately surrounding the home apartment, is in the order of at least −60 dBm; a minimum of 22 dB difference. Hence, in this example, if the CS/CCA threshold or receive sensitivity threshold is set to −50 dBm and there are at least 5 channels available, then the home apartment 41 could select a channel and transmit at the same time as any other network in any other apartment. If all apartments had networks where the CS/CCA threshold or receive sensitivity threshold was set to −50 dBm, then because the network in each apartment had a maximum of only 4 overlapping interfering networks, the channel reuse is significantly improved and, for example, each network could operate using an independent 40 MHz channel.

Example 3 is that of the case of terraced houses as shown in FIG. 4.

In this example the positions of the stations, STA 1, 71, STA 2, 72, STA 3, 73 and STA 4, 74, are chosen so as to represent the worst case for interference to STA 1, 71. The received signal strengths at the various devices can be estimated using the Erceg formula for indoor propagation loss. Assuming a penetration loss of 10 dB for the walls, the calculated results for received signal strength for the STAs are:

STA 1, 71, STA 2, 72, STA 3, 73 and STA 4, 74 to respective APs −48 dBm STA 2, 72, to STA 1, 71 −34 dBm STA 3, 73, to STA 1, 71 −68 dBm STA 4, 74 to STA 1, 71 −84 dBm Note that with the default CS/CCA threshold value of −82 dBm, STA 2, 72, and STA3, 73, would both exert CCA on STA 1, 71, if they used the same channel and that STA 4, 74, may exert CCA at STA 1, 71, periodically. Note that if the CS/CCA threshold of STA 1, 71, were set to −50 dBm, or even −60 dBm, then transmissions from STA 3, 73, or STA 4, 74, would not cause STA 1, 71 to exert CCA and STA 1, 71, could transmit at the same time that STA 3, 73, or STA 4, 74, was transmitting. Note also that in this case, the transmission from STA 3, 73, to AP3, 63, would be successful as the SNIR at AP2, 62, would be at least 20 dB. Furthermore, as STA 1, 71, is at the furthest possible distance from its AP, AP1, 61, note that any station located in the same house as STA 3, 73, could transmit at the same time as any station in the same house as STA 1, 71, with an SNIR of 20 dB or more and hence have a successful communication, and vice versa. However, if the STAs are using the default CS/CCA threshold of −82 dBm, this is not the case and only one station could transmit at a time. As in the previous examples, raising the CCA threshold or the receive sensitivity threshold would allow simultaneous transmissions and increase the potential throughputs of the networks.

Example 4 is shown in FIG. 5 and represents using a 7-cell cluster of networks with an AP situated at the center of each cell.

Two adjoining seven cell structures are shown. Seven different channel frequencies are used, one for each of the 7 cells in each cluster. As shown in FIG. 5, the same channel frequency that is used in the cell where STA A 91 and AP A 81 are located is also used in the cell where STA B 92 and AP B 82 are located. The positions of STA A 91 and STA B 92 are chosen to represent a worst case. Assuming that the radius of each cell is r then the distances between the APs and STAs of interest, using standard geometry, are:

Distance STA A 91 to AP A 81=r

Distance AP A 81 to AP B 82=4.77r

Distance STA A 91 to STA B 92=2.64r

Distance STA B 92 to AP A 81=3.61r

Assuming the propagation loss due to distance is 35 log(d), where d is the distance, and assuming an additional obstruction loss of 3 dB per cell wall, then STA A 91 will receive transmissions from STA B 92 at a level equal to −(35 log(2.64)+9)=−24 dB relative to a signal from AP A 81. Also, AP A 81 will receive a signal from STA B 92 at a level of −(35 log(3.61)+9)=−29 dB relative to a signal from STA A 91. If we assume a cell radius of 40 feet, then the signal strength of the signals between STA A 91 and AP A 81, using the Ecerg formula, is in the order of −50 dBm, and similarly the signal strength of the signals between STA B 92 and AP B 82, is also in the order of −50 dBm. Hence STA A 91 would receive transmissions from STA B 92 at a signal strength of about −50−24=−74 dBm which is high enough to cause STA A 91 to exert CCA and hence prevent both STA A 91 and STA B 92 from transmitting at the same time. If STA A 91 could set its CS/CCA threshold or its receive sensitivity higher than −74 dBm, then STA B 92 transmissions would not exert CCA in STA A 91 and STA A 91 could transmit at the same time as STA B 92 with sufficient SNIR.

Similarly if STA B 92 set its CS/CCA threshold or receive sensitivity threshold higher than −74 dBm, then STA A 91 transmissions would not exert CCA in STA B 92 and STA B 91 could transmit at the same time as STA A 91 with sufficient SNIR. Therefore, if the CS/CCA threshold or the receive sensitivity threshold was set at −50 dBm or −60 dBm, and there were at least 7 channels available, then a seven cell cluster network area layout is possible. Using the default CS/CCA threshold a seven cell cluster layout is not possible.

In each of these examples it is shown that practical situations exist where networks on the same channel could be transmitting simultaneously but are prevented from doing so because of the default CS/CCA threshold. To overcome this, the CS/CCA threshold or the receive signal threshold could simply be set to a higher value but, as will be shown later, this does not result in a network coverage area that accommodates all the STAs that are within the desired area. An alternative may be to use transmit power control, TPC. The major problem with TPC is that unless every STA in the network and, more importantly, every STA in all surrounding networks is using TPC, it does not produce the desired effect. In addition if one STA or network uses TPC it puts itself at a disadvantage as it effectively can make itself hidden from other STAs and networks and hence experience problem in competing for the medium. Therefore, there is no incentive for a STA or network to use TPC.

SUMMARY OF THE INVENTION

According to an embodiment of the invention there may be provided a wireless communication device, a method and a computer readable medium.

There may be provided a method for determining an attribute of a carrier sense multiple access with collision avoidance (CSMA/CA) scheme, the method may include receiving, by an interface of a wireless communication device, an input signal; calculating, by a processor of the wireless communication device, a strength of the input signal; and determining, by the processor, the attribute of the (CSMA/CA) scheme in response to the strength of the input signal.

The input signal may be a management frame that may be transmitted by an access point to which the wireless communication device may be associated.

The input signal may be a beacon frame that may be transmitted by an access point to which the wireless communication device may be associated.

The determining of the attribute of the (CSMA/CA) scheme may be responsive to the strength of the input signal when the strength of the input signal does not exceed an upper limit.

The determining of the attribute of the (CSMA/CA) scheme may include setting a clear channel assessment threshold in relation to the strength of the input signal.

The method may include setting the clear channel assessment threshold to a level that may be equal to the strength of the input signal minus a margin.

The method may include calculating the strength of the input signal by averaging strengths of input signals that were calculated at different points in time within a time period.

The method may include counting a number of successive missed beacon frames; defining a limit for a number of successive missed beacon frames; and reducing the attribute of the (CSMA/CA) scheme when the number of successive missed beacons exceeds the limit.

The attribute of the (CSMA/CA) scheme may be a receive sensitivity threshold.

The method may include setting the receive sensitivity threshold to a level that may be equal to the strength of the input signal minus a margin.

The method of claim may include calculating the strength of the input signal by averaging strengths of input signal that were calculated at different points in time within a time period.

The method may include counting a number of successive missed beacon frames; defining a limit for a number of successive missed beacon frames; and reducing the attribute of the (CSMA/CA) scheme when the number of successive missed beacons exceeds the limit.

There may be provided a wireless communication device that may include an interface and a processor; wherein the interface may be arranged to receive an input signal; wherein the processor may be arranged to calculate a strength of the input signal; and determine the attribute of the (CSMA/CA) scheme in response to the strength of the input signal.

The wireless communication device may include a transmitter, wherein the transmitter may be arranged to transmit output signals according to the attribute of the (CSMA/CA) scheme.

The input signal may be a management frame that may be transmitted by an access point to which the wireless communication device may be associated.

The input signal may be a beacon frame that may be transmitted by an access point to which the wireless communication device may be associated.

The processor may be configured to determine the attribute of the (CSMA/CA) scheme in response to the strength of the input signal when the strength of the input signal does not exceed an upper limit.

The processor may be configured to determine the attribute of the (CSMA/CA) scheme by setting a clear channel assessment threshold in relation to the strength of the input signal.

The processor may be configured to set the clear channel assessment threshold to a level that may be equal to the strength of the input signal minus a margin.

The wireless communication device of claim wherein the processor may be configured to calculate the strength of the input signal by averaging strengths of input signals that were calculated at different points in time within a time period.

The processor may be configured to count a number of successive missed beacon frames; define a limit for a number of successive missed beacon frames; and reduce the attribute of the (CSMA/CA) scheme when the number of successive missed beacons exceeds the limit.

The attribute of the (CSMA/CA) scheme may be a receive sensitivity threshold.

The processor may be configured to set the receive sensitivity threshold to a level that may be equal to the strength of the input signal minus a margin.

The processor may be configured to calculate the strength of the input signal by averaging strengths of input signal that were calculated at different points in time within a time period.

The processor may be configured to count a number of successive missed beacon frames; define a limit for a number of successive missed beacon frames; and reduce the attribute of the (CSMA/CA) scheme when the number of successive missed beacons exceeds the limit.

There may be provided a non-transitory computer readable medium that stores instructions that once executed cause a wireless communication device to computer to receive an input signal; calculate a strength of the input signal; and determine the attribute of the (CSMA/CA) scheme in response to the strength of the input signal.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates prior art attenuations of an apartment building;

FIG. 16 illustrates a stage of the method of FIG. 15 according to an embodiment of the invention;

FIG. 17 is a flow chart of a method according to an embodiment of the invention.

DETAILED DESCRIPTION OF THE DRAWINGS

Figure 1:
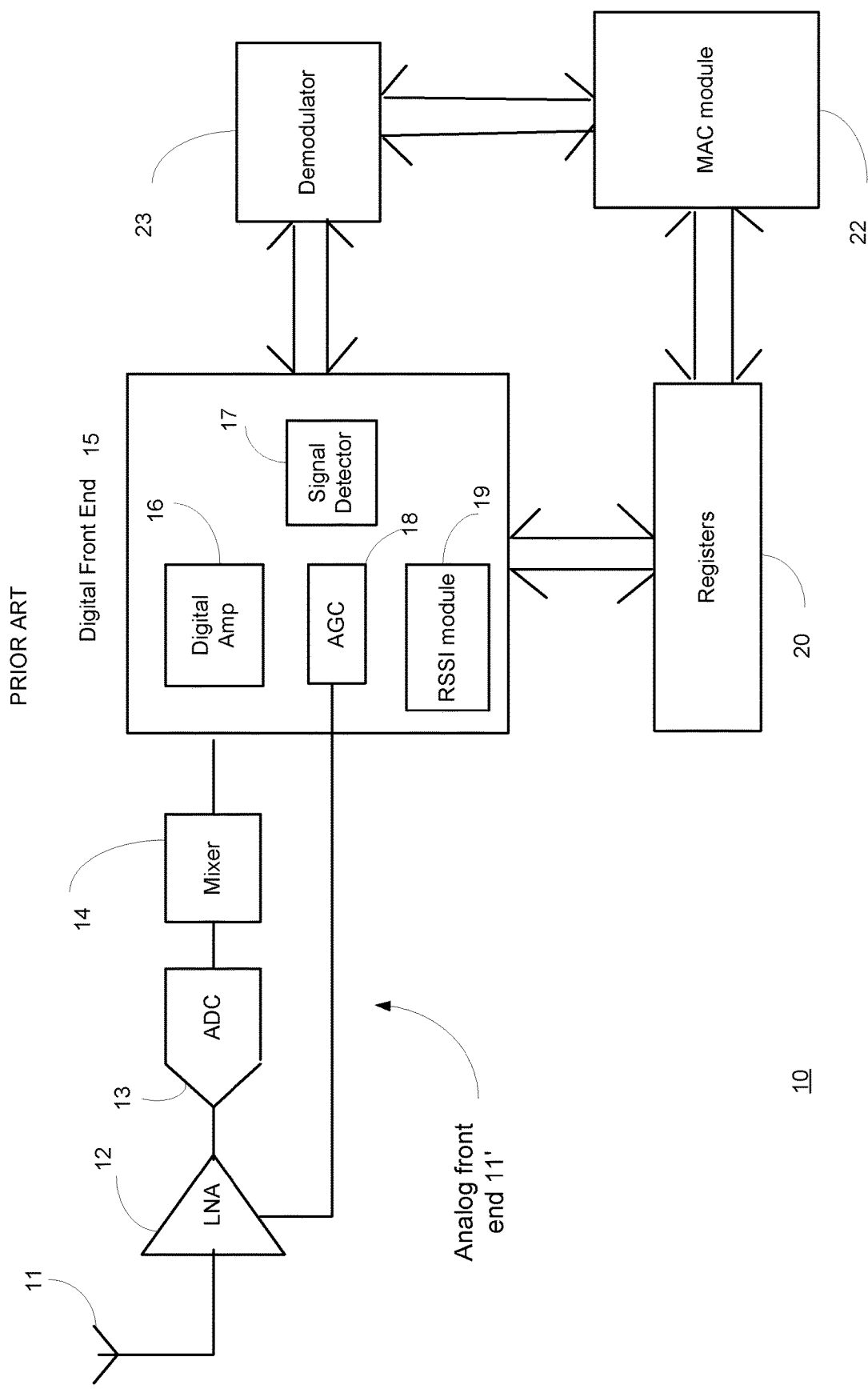
FIG. 1 illustrates a prior art wireless receiver.
Figure 2:
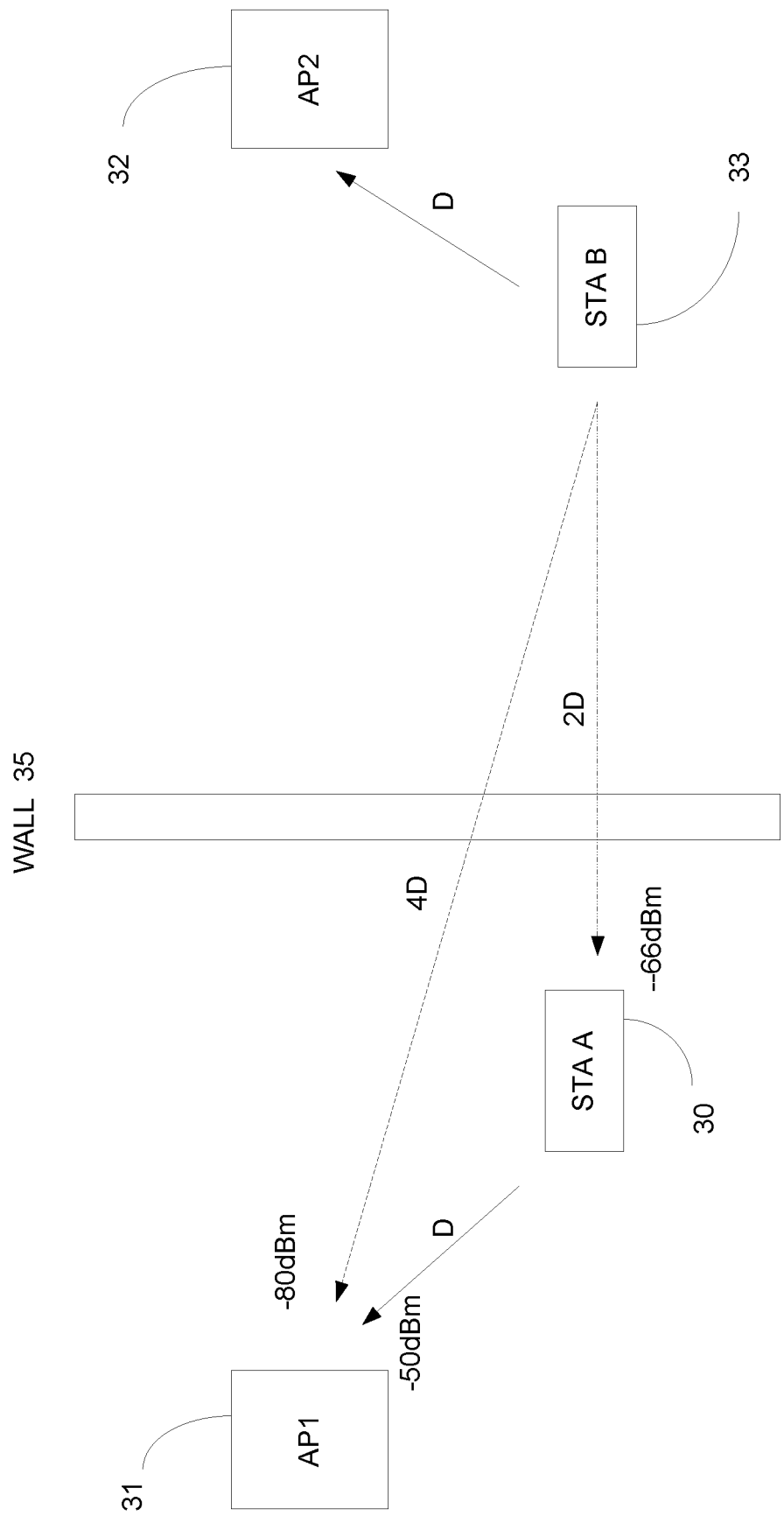
FIG. 2 illustrates a prior art wireless communication network.
Figure 4:
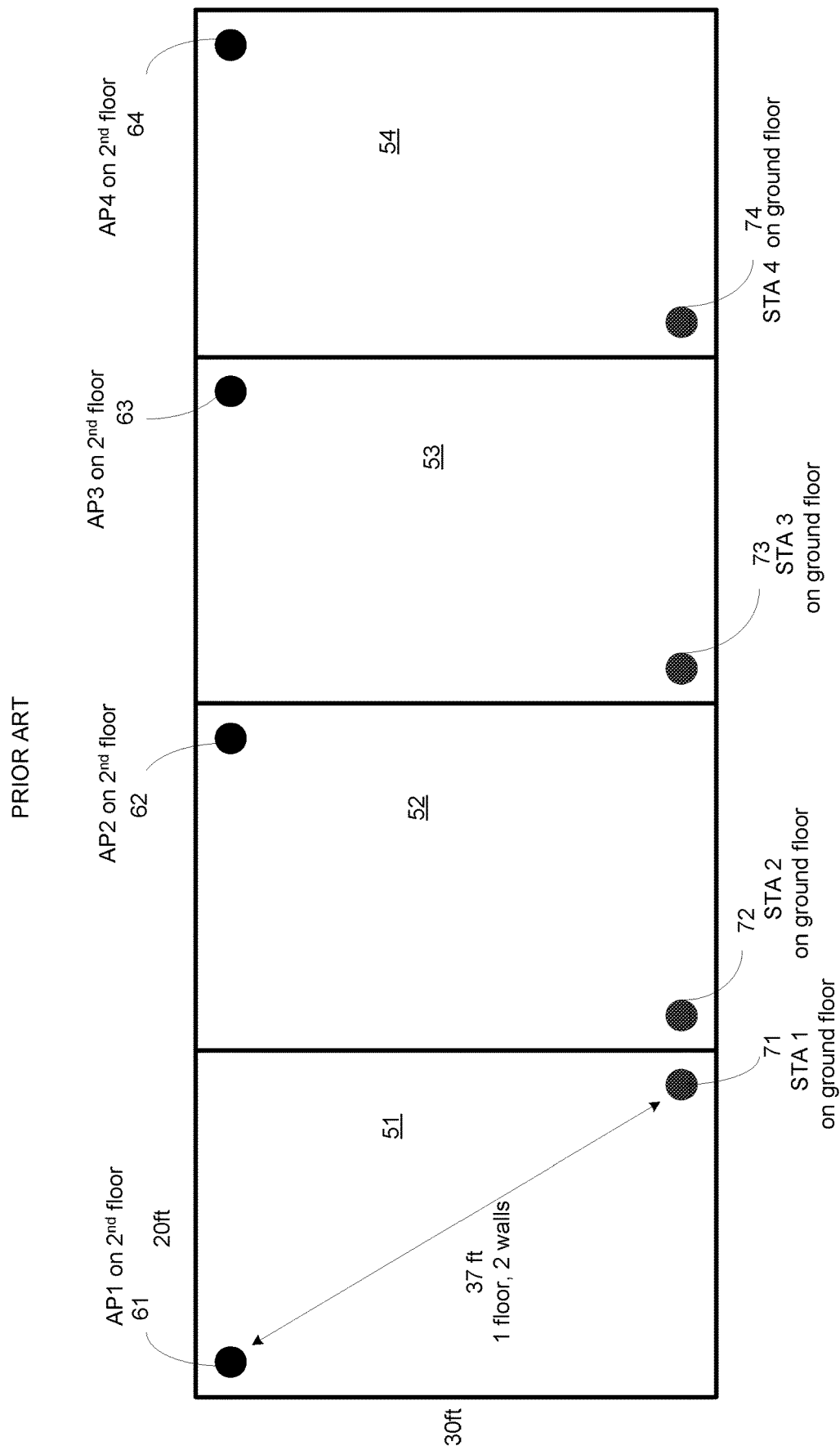
FIG. 4 illustrates a prior art network located in a building.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

In order to improve the overall throughput and efficiency of wireless networks, a scheme is proposed where either the CCA threshold or the receive sensitivity of a station is dynamically adjusted such that the effective CCA threshold meets the prevailing conditions. By so doing, this allows simultaneous transmissions from overlapping networks which are presently prevented from doing so. This scheme is termed dynamic sensitivity control, DSC.

DSC is a scheme which enables wireless stations to set their receive sensitivity thresholds such that they can receive the wanted signals and reduce the reception of unwanted signals from other interfering devices. In one embodiment, in a wireless network that uses CSMA/CA as the means to gain access to the medium, for example a Wi-Fi network, the DSC STA continuously records the received signal strength of signals, such as the beacons, from the AP to which it is associated, over a preset period. The DSC STA then calculates an average updated value of the received signal level. The setting of the receive sensitivity threshold and hence the effective clear channel assessment, CCA, threshold is then set at a certain margin below the averaged signal level. This level is updated at regular intervals. By setting the upper value of the receive sensitivity threshold and the value of the margin, the contention area for a network can be set and improvements to channel re-use and overall area data throughputs result. A DSC STA can be used either by itself or in a managed network with DSC where the AP advertises the values for the upper limit and margin and the AP sets its own sensitivity threshold accordingly.

There is provided a wireless communication device (such as a station STA) that measures the received signal strength of transmissions over a period of time. The STA then sets its CCA threshold, either directly or by setting its receive sensitivity threshold, to a value equal to the average received signal strength minus a margin. For example, in wireless local area network, WLAN, using CSMA/CA, if the average received signal strength of signals from the access point, AP, to which a STA is associated, is −40 dBm, and the margin is set to 20 dB, then that STA would set its effective CCA threshold to −60 dBm. The value of the margin ensures that the level of any interfering signal on the same channel that does not cause that STA to exert CCA, must be such that the SNIR at that STA will be at least the value of the margin, in this example 20 dB. An SNIR of 20 dB would correspond to a signal with 16-QAM modulation and 3/4 coding, for example. It is desirable that all STAs within the same network are within the CCA threshold of each other STA in the network so that they will all compete equally for the medium and for this reason an upper limit is required to set the minimum signal strength level for the average received signal strength from the AP. For example, if the STA is very close to the AP, say about 1 foot, then the average received signal strength from the AP would be in the order of −15 dBm. With a margin of 20 dB the receive sensitivity threshold, the effective CS/CCA threshold and the effective ED-CCA would be set to only −35 dBm. This relatively high CCA threshold level may be such that other STAs in the same network, that are further than about 12 feet from the STA would not exert CCA in the STA that is close to the AP. A range of only 12 feet only possibly covers a single room and not a complete apartment or a house. Hence, in this case many other STAs in the same network would be hidden from the STA close to the AP and this would result in unfair contention and the network efficiency and throughput would suffer. For this reason an upper limit value, UL, for the minimum received sensitivity is used and that effectively sets the desired area coverage of the network. For example, if a UL value of −35 dBm is used, then with a margin of 20 dB the highest possible value for CCA threshold in the network would be −35−20=−55 dBm. This represents a distance of about 50 feet as compared to 12 feet in the case that the upper limit is not used.

In a network, a station, STA is receiving beacons, other management frames, control frames and data frames from the access point AP or a group owner GO in the case of a Wi-Fi Direct network. Management frames include probe responses, association responses and authentication responses as well as beacons. Control frames include acknowledgments, block acknowledgements, RTS and CTS frames. In the following description an AP is assumed but the same processes described would also apply for a GO. Any or a combination of the beacons, other management frames, action frames or data frames could be used for the STA to assess the mean received signal level of the AP transmissions. In the embodiment described hereunder, the signal strength of the beacons is used. The beacons are being received on a regular basis, usually at 100 ms intervals, at the same data rate and are transmitted at the same transmit power. Hence, beacons provide a regular, reliable source of received signals for measurement purposes. It should be noted that although the scheme as described in hereunder dynamically adjusts the receive sensitivity threshold, a variation would be to dynamically adjust the CCA threshold directly. Setting the receive sensitivity threshold at or above the default CS/CCA threshold effectively sets the CS/CCA threshold to the same level as the receive sensitivity threshold. Similarly setting the receive sensitivity threshold at or above the default ED-CCA threshold effectively sets the ED-CCA threshold to the same level as the receive sensitivity threshold. Conversely, if the receive sensitivity threshold is set below the default CS/CCA or ED-CCA thresholds, then the default CCA thresholds are unaffected.

The STA records the received signal strength of each of the beacons from the AP to which it is associated. In practice the STA will probably record the RSSI value, where RSSI is the received signal strength indicator. There is a direct relationship between RSSI and the received signal strength. The STA then calculates an average updated value of the received signal level over a set period. The STA may use a simple average or a moving average scheme to calculate the average signal level over a set time period. The received signal strength will vary over time with movement and as conditions change around the STA. At the end of each time period, the receiver sensitivity threshold of the STA is then set to a value that is at a fixed margin below the average received signal level. This receiver sensitivity threshold value is therefore updated at regular intervals. For example, assume that it is desired to update the received sensitivity threshold updates at 1 second intervals. At 100 ms intervals the STA would note the received signal strength measurement of the beacon and calculate the running average of the signal level for a period of one second. Then at one second intervals the STA will set or reset its receiver sensitivity threshold value. By setting its receive sensitivity threshold, if this threshold is equal or above the CCA threshold, the STA is also effectively setting the effective CCA threshold level.

This process is termed dynamic sensitivity control, DSC. A station using DSC is termed a DSC STA.

There are two basic settings for DSC: the upper limit, UL, and margin, M. In general the DSC STA measures the average signal strength of the received beacon, R dBm, and then subtracts the margin M dB to arrive at the value for the receiver signal strength threshold. For example, if the average signal strength, R, of the beacon is −45 dBm and the margin, M, is set to 20 dB, the receive sensitivity threshold of the DSC STA is set to R−M=−45−20=−65 dBm. Hence, in this case, no received signal with a signal strength of less than −65 dBm will be recognized by that station. Assuming an internal wall loss of 3 dB and walls spaced every 20 feet, this particular sensitivity would correspond to a distance in the order of 70 feet for signals from other stations that would be received by the DSC STA and would exert CCA at the DSC STA. If the DSC STA is very close to its AP, say about 1 foot distance, then the received beacon signal strength would be in the order of −15 dBm. In this case the receive sensitivity threshold could be set to −35 dBm, which represents a much more limited range of about 10 to 15 feet and other stations in the same network that are further away than 15 feet from the DSC STA would not be received by the DSC STA and hence be hidden to the DSC STA. The network efficiency would then suffer as the contention for the medium is then unfair. The upper limit, UL, is set to represent the maximum value for the received signal strength of the beacon that can be set as the received signal strength and thus effectively sets the minimum receiver sensitivity threshold as UL−M. For example, if the upper limit, UL, is set to −30 dBm and the margin, M, set to 20 dB, then the minimum value for the receive sensitivity threshold is UL−M=−30−20=−50 dBm, a range of about 40 feet. Setting the upper limit and margin values it is possible to set the effective network coverage area wherein all stations would contend.

If a fixed CCA threshold is used, then the result is that the coverage area of a network has large areas where other STAs are effectively hidden with the result that the contention in network does not cover all the stations in the network and the basic CSMA/CA scheme breaks down. This problem is presented in FIG. 6.

Figure 5:
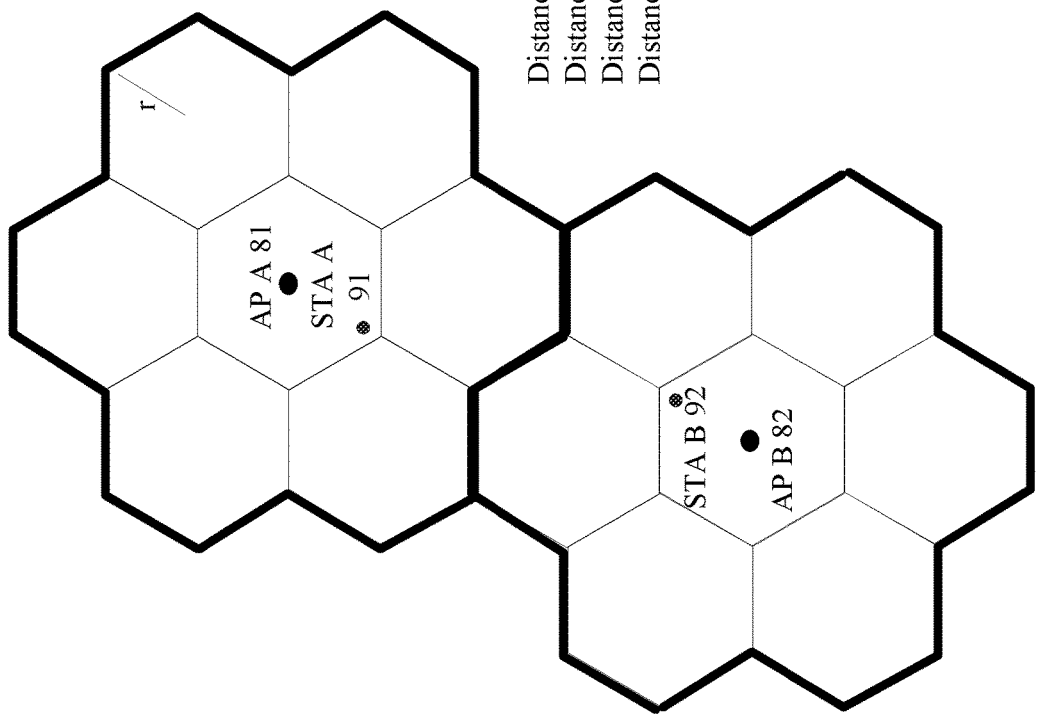
FIG. 5 illustrates a prior art 7-cell cluster of networks with an access point situated at the center of each cell.
Figure 6:
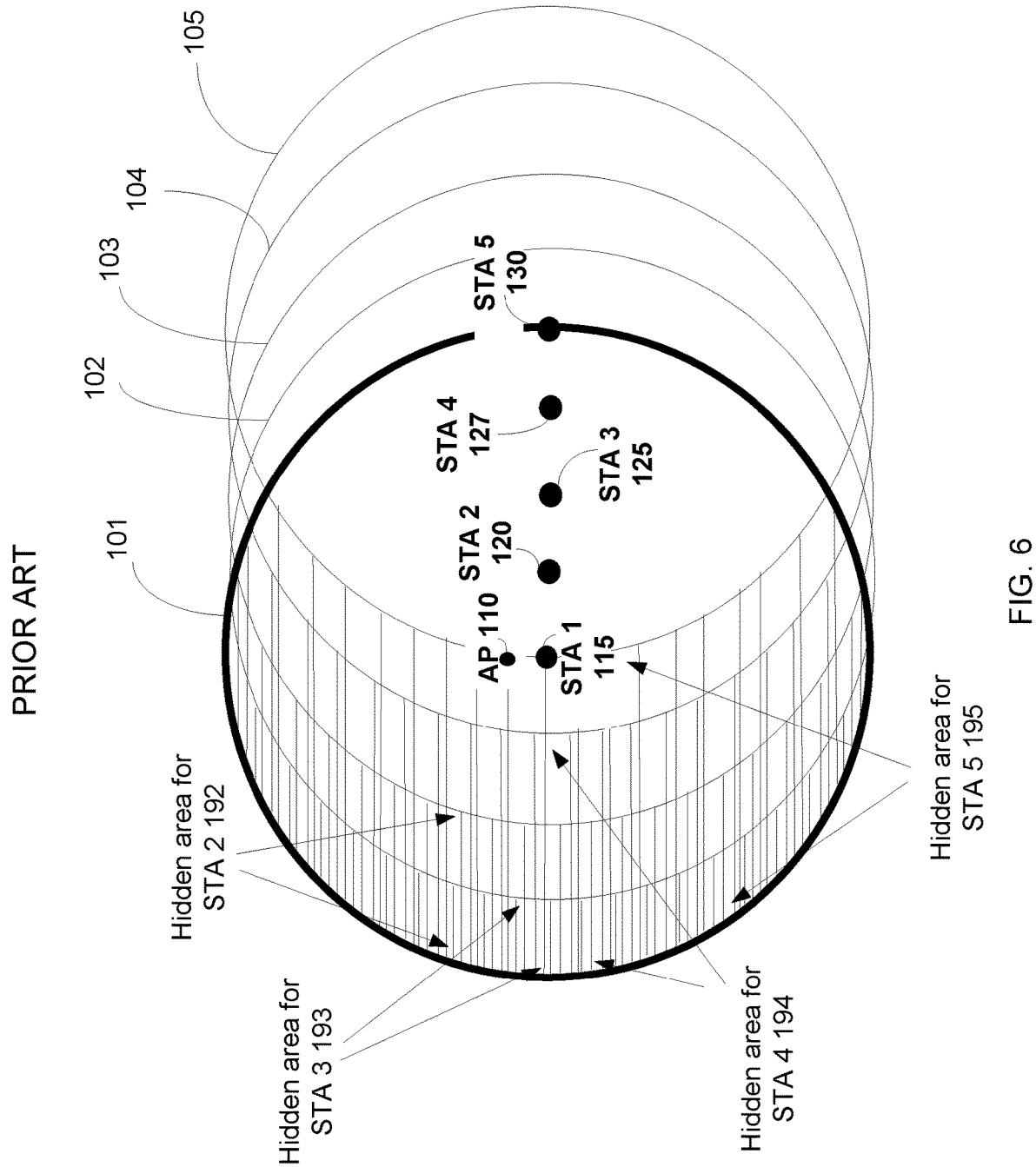
FIG. 6 illustrates prior art contention areas of a wireless network using a fixed CCA threshold.

FIG. 6 represents a network of at least 5 STAs, 115, 120, 125, 127, 130. As shown in FIG. 5, a fixed value for CCA threshold is used, and the contention area around each STA in the network is a circle and each circle around each STA 115, 120, 125, 127, 130 is of the same radius. In this example, the setting of the CCA threshold is such that the radius of the contention area circle 105 for STA 5 130 is just within the range of STA 1, 115, which is located close to the AP 110, such that STA 5, 130, will exert CCA in STA 1, 115, and vice versa. If the STAs 115, 120, 125, 127, 130 are equally spaced 10 feet apart and the CS/CCA threshold is fixed and set to −50 dBm, the contention area circles 101, 102, 103, 104, 105 as shown in FIG. 6 result. In this case, any other STAs in the network that are located in the area outside of the circle 105 that is centered on STA 5, 130 namely all the area 195 that is shaded in FIG. 6, will be hidden from STA 5, 130, but not from STA 1, 115, and hence the contention is now unfair. In this particular case, STA 1, 115, would suffer as it will need to defer to transmissions from STA 5, 130, and any other STA within the shaded area 195, which will curtail its ability to transmit, and, in addition, transmissions from STA 5, 130, and any STA within the shaded area 195 are prone to clash at the AP 110 and not be successful. Similarly for STA 2, 120, STA 3,125, and STA 4,127, shown in FIG. 6, the size of the areas 192, 193, 194 where hidden STAs can be located varies according to the distance of each STA, 120, 125, 127 from STA 1, 115, respectively. The result is that the use of a fixed value for CCA threshold, especially when the value is to be set at a relatively high value compared to the default setting, can result in many hidden STAs within a network which results in inefficiency.

Figure 7:
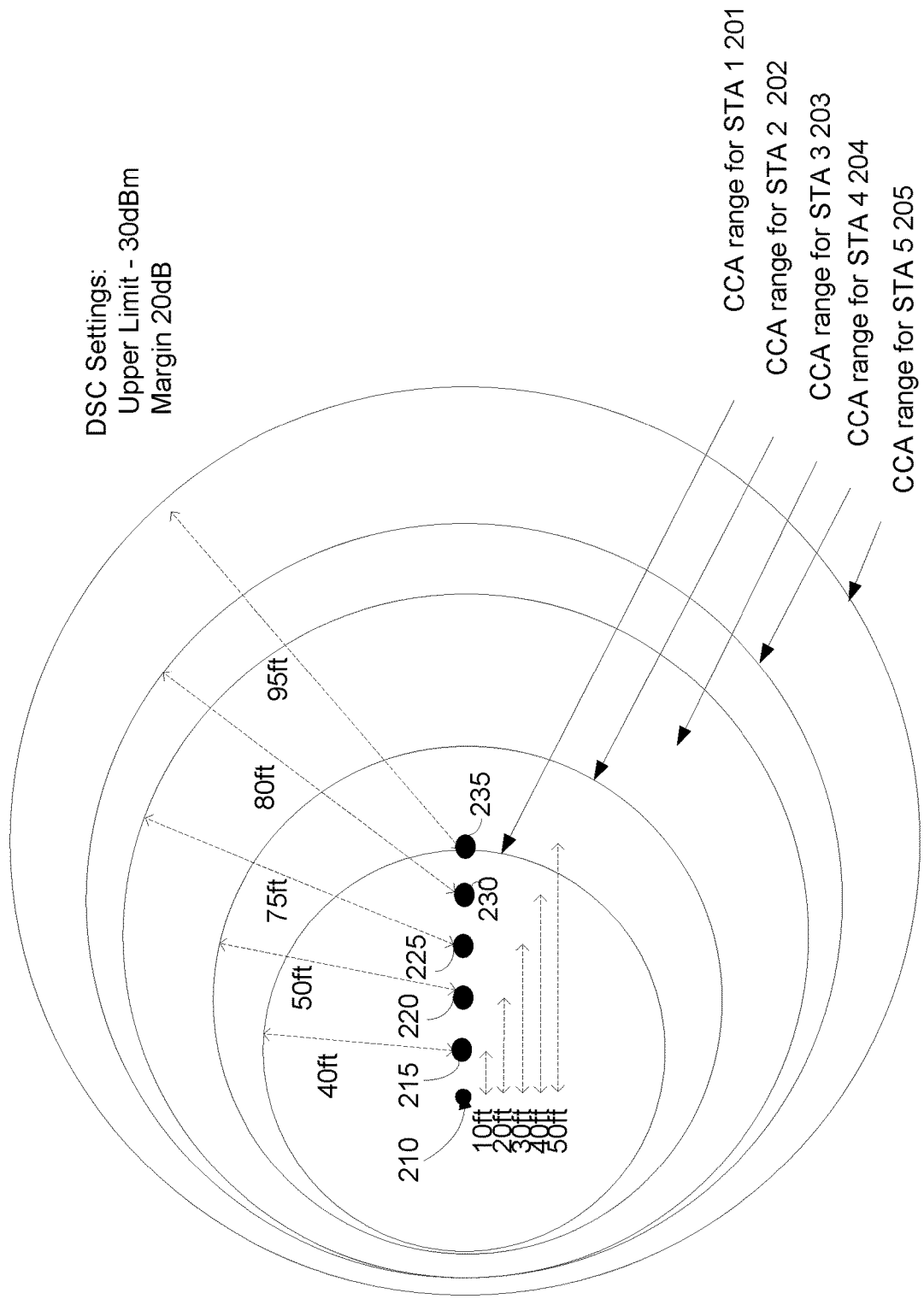
FIG. 7 illustrates contention areas of a wireless network using a dynamic CCA threshold according to an embodiment of the invention.

FIG. 7 shows a similar network to that shown in FIG. 6 but in this case dynamic sensitivity control DSC is used and the STAs, 215, 220, 225, 230, 235 are DSC STAs. In the example network shown in FIG. 7, the DSC setting for upper limit, UL, is −30 dBm and the setting of the margin, M, is 20 dB.

The five DSC STAs, 215, 220, 225, 230, and 235 are equally spaced at 10 feet spacing from the AP 210; STA 1, 215, is 10 feet distance from the AP 210 and STA 5, 235, is 50 feet away from the AP 210. The average signal strength of beacons or signals from the AP 210 would be in the order of −28 dBm at STA 1, 215. As the upper limit is set to −30 dBm and the margin to 20 dB, the effective CCA threshold for STA 1, 215, will be set to −50 dBm and this corresponds to a circle 201 centered on STA 1, 215, with a radius of 40 feet within which any other STA can exert CCA on STA 1, 215. STA 5, 235 is the furthest from the AP 210 at a distance of 50 feet. To estimate ranges the Ecerg formula is used together with an assumption of an obstruction loss of 3 dB every 20 feet. This 3 dB loss would be representative of an internal wall. Hence STA 5, 235, would receive beacons or signals from the AP with a signal strength of about −60 dBm. Hence STA 5, 235, will set its receive sensitivity threshold and its effective CS/CCA threshold to −80 dBm. The contention range therefore for STA 5, 235, corresponds to the circle 205 centered on STA 5, 235, with a radius of about 95 feet within which any other STA will exert CCA on STA 5, 235. Note that the contention range circle 205 for STA 5, 235, fully encloses the contention range circle 201 for STA 1, 215. Similarly, for STA 2, 220, STA 3, 225, and STA 4, 230, their respective contention range circles, 202, 203 and 204 respectively, all enclose that of STA 1, 201. Hence, by setting the upper limit to −30 dB and the margin to 20 dB, the network area is set such that all STAs within the area 201 as shown for STA 1, 215, will all contend correctly for the medium. It should also be noted that the AP 210 may also set its own CCA threshold to be compatible with that of the STAs that are associated to it. In addition the AP 210 may also provide the values for UL and M that all STA that are associated to it, shall use. This could be carried out using an information element in the beacon and probe responses.

The value used by a DSC STA for the margin needs to be sufficiently large so as to provide adequate SNIR. If two DSC STAs or if a DSC STA and a legacy STA are transmitting at the same time, then by definition, the minimum SNIR for each STA will be equal to the value of the margin, M. Examples of the required SNIR for common modulations that provide a high data rate are: 30 dB for 256-QAM with 3/4 coding, 25 dB for 64-QAM modulation with 3/4 coding rate, 22 dB for 64-QAM modulation with 2/3 coding rate, 19 for 16-QAM modulation with 3/4 coding rate. The margin, M, represents the absolute minimum SNIR that would be expected. In addition, the margin needs to be large enough to account for sudden changes in the received signal level. If the DSC STA moves behind a wall, for example, it should not lose the wanted signal that is used to set the DSC threshold. Therefore the margin should be larger than an expected sudden decrease due to such a situation. The example used of 20 dB should be generally sufficient assuming that with the distribution of STAs in an interfering network, the SNIR could be reasonably expected to be generally greater than the margin M, which represents the absolute minimum value. However, the value of 20 dB is simply an example and does not imply a fixed value. The upper limit, UL, and margin, M, can be set to suit the application, desired network coverage and desired traffic data rates.

An AP may advertise the values for upper limit and margin that are to be used by DSC STAs associated to that AP and the AP may then set its own CCA thresholds to be compatible with the DSC STA settings. This ability has particular value in enterprise networks and hotspots. In addition, and AP could advertise that the use of DSC is not allowed. This may have value when an AP desires that the network area coverage is as large as possible. The CCA values for M and UL as well as the command that DSC is not allowed could be advertised in one or more information elements that the AP could include in beacons and probe responses.

It should be noted that a station using the proposed scheme, a DSC STA, does not, in general, have an adverse effect on other legacy stations in the other networks that do not use the scheme. For example, if a legacy station is located in an overlapping network, if that legacy station is transmitting and the DSC STA also starts to transmit, there is no effect on the legacy STA which will complete its transmission. The DSC margin is such that the SNIR at each STA is sufficient for both transmissions to be successful. In the case that the DSC STA is already transmitting when a legacy STA wishes to transmit, the DSC STA will exert CCA at the legacy STA, and the legacy STA will need to wait until the DSC STA has completed its transmission as is the case if the DSC STA were a legacy STA. Hence, in this latter case there is no difference to the legacy STA. In fact in simulations it can be shown that in general there is an overall advantage to the legacy STA, and the overlapping legacy network, as the simultaneous transmissions by the DSC STA reduce the contention wait times at the legacy STA which would normally have to wait for the entire duration of each transmission of an overlapping STA.

Dynamic Sensitivity Control (DSC) enables an IEEE 802.11 station (STA) to dynamically set its CCA threshold either directly or by setting the receiver sensitivity threshold. A STA using DSC is referred to as a DSC STA. The network controller is an access point (AP) in the case of an infrastructure network, or a group owner (GO) in the case of a Wi-Fi Direct network.

Figure 8:
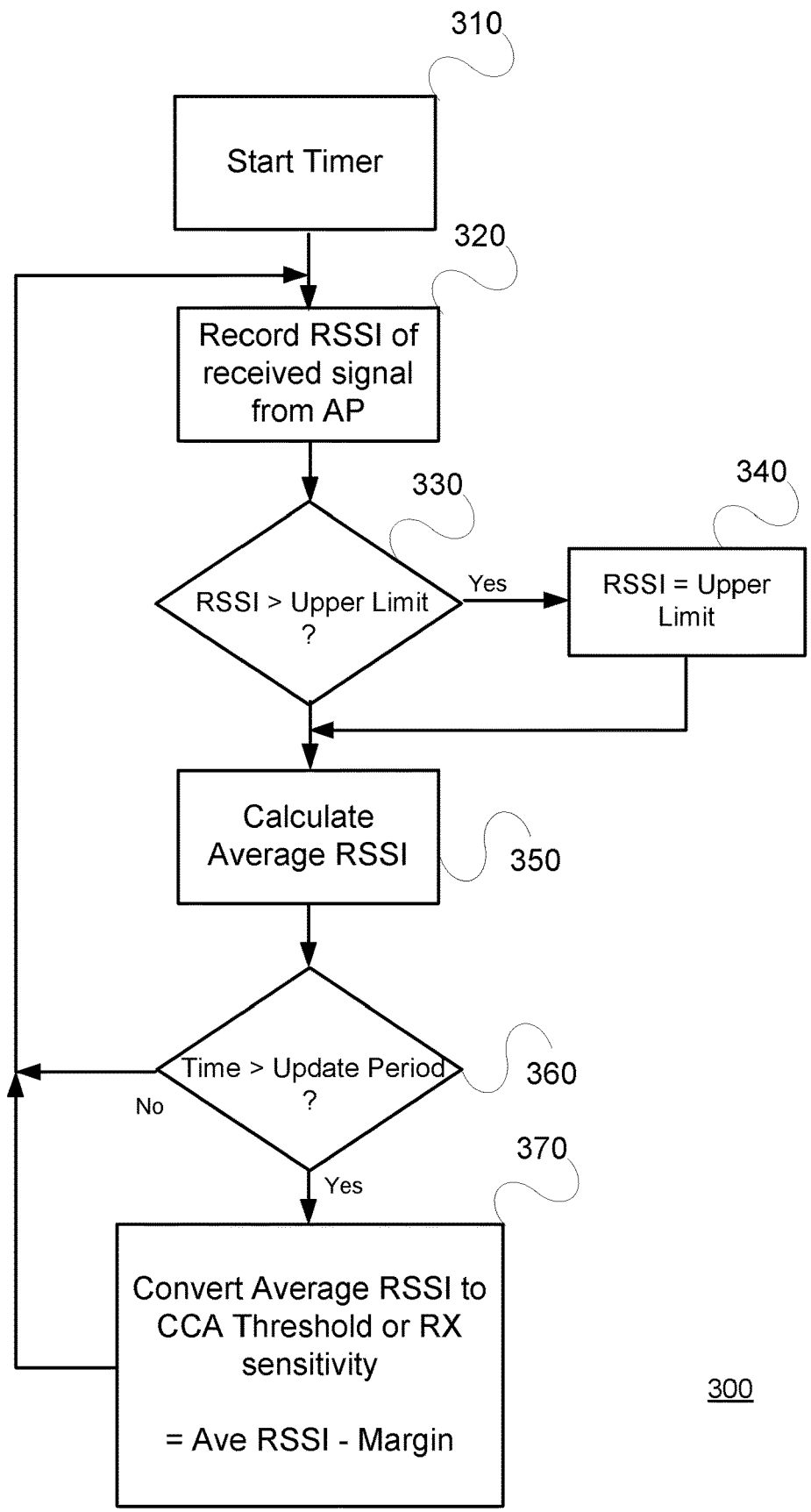
FIG. 8 is a flow chart diagram of a method for a basic derivation of the setting of the CCA threshold using DSC according to an embodiment of the invention.

FIG. 8 is a flow chart diagram that shows an embodiment for the basic derivation of the setting of the CCA threshold using dynamic signal strength, DSC. At step 310 a timer is started. At step 320 the DSC STA records the received signal level of a signal from the AP to which it is associated. In practice the STA will probably record the RSSI value, where RSSI is the received signal strength indicator. Any signal or combination of signals from the AP may be used: management, control or data frames. At step 330 the received signal level is checked against an upper limit value. If the received signal level from step 320 is higher than the upper limit value, then in step 340 the signal level recorded in step 320 is replaced with the upper limit value. At step 350, a running average of the recorded received signal levels from step 340 or the substituted upper limit values from step 340, is calculated. Any averaging calculation may be used in step 350 including but not limited to a simple average or a moving average scheme. At step 360 the elapsed time since step 310 is checked. If the elapsed time is greater than an update period, then the average signal level from step 350 is converted, in step 370, to determine the setting of the CCA threshold. The CCA threshold is set to a value that is equal to the average received signal level from step 350, minus a preset margin. The CCA threshold value may be directly set as a result of this calculation in step 370, or alternatively the receive sensitivity threshold value for the DSC STA may be set, which effectively sets the CCA threshold to the same value.

Figure 9:
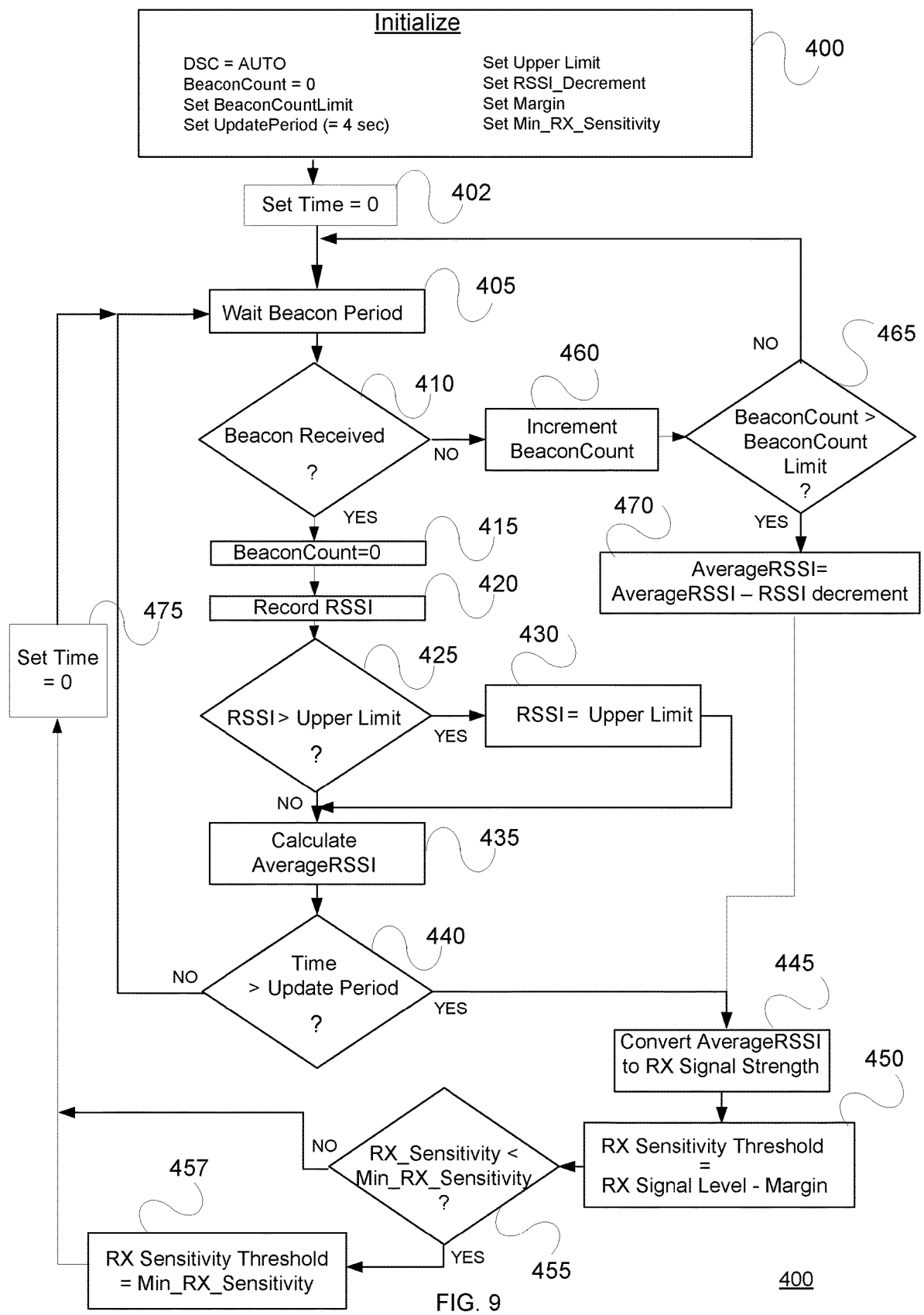
FIG. 9 is a flow chart for a method for derivation of the CCA threshold value according to an embodiment of the invention.

FIG. 9 is a flow chart for the derivation of the CCA threshold value which corresponds to one detailed embodiment of the DSC scheme. In step 400 the routine is first initialized as follows:

BeaconCount, the number of consecutive missed beacons, is preset to zero.

BeaconCountLimit, the limit of consecutive missed beacons, is set to a preset value.

An example default value is 5.

UpdatePeriod, the period over which the received signals are averaged, is set to a preset value. An example default value is 1 second.

UpperLimit, UL, the maximum value of received signal strength to be used, is set to a preset value. The equivalent value for RSSI may be used. An example default value is −30 dBm.

RSSI_Decrement, the value, in dBs, that the existing average RSSI or received signal strength value is decreased by if the BeaconCountLimit is exceeded. An example default value is 6 dB.

Margin, the value, in dBs, that is subtracted from the average RSSI received signal strength value in order to set the received sensitivity threshold or CCA threshold. An example default value is 20 dB.

Min_RX_Sensitivity, the minimum value for receiver sensitivity threshold, is set to the value that corresponds to the RX sensitivity threshold of the STA if DSC was not in use. This value is governed by the minimum supported modulation rate and the noise figure of the device. A typical value would be −91 dBm.

In step 402 the time is set to zero. In step 405 the DSC STA waits for a beacon from the AP to which it is associated. Any transmission from the AP may be used but as the beacons are at a regular rate and are always transmitted at the same power level, they provide a convenient set of signals to monitor. Step 410 checks that a beacon is received. As beacons are transmitted at a near constant rate, it is straightforward to determine if a beacon has been missed. If it is determined that the beacon is missed, then in step 460, the BeaconCount is incremented. In step 465 the BeaconCount value from step 460 is checked against the BeaconCountLimit preset value from step 400. If the BeaconCount value does not exceed the BeaconCountLimit value, then the flow returns to step 405 to await the next beacon. If at step 410 the beacon is received then in step 415 the value of BeaconCount, the number of consecutive missed beacons, is set or reset to zero and the value of the received signal strength or RSSI of the beacon is recorded in step 420. In step 425 the value of the recorded signal strength, RSSI, from step 420 is checked against the UpperLimit preset value from step 400. If the RSSI reading from step 420 exceeds the UpperLimit from step 400, then in step 430 the recorded RSSI value from step 420 is replaced by the UpperLimit value. The input to step 435 is therefore either the recorded RSSI value from step 420, via step 425, or the UpperLimit value from step 430. In step 435 the average RSSI value, AverageRSSI, is calculated. This averaging of the received signal strengths may be determined by any averaging scheme or indeed by simply taking the latest vale. The averaging, if used could be either a simple running average or a moving average. In step 440 the elapsed time since the time was set to zero either in step 402 or step 475 is checked. If the time has not exceeded the UpdatePeriod preset value from step 400, then the flow is returned to step 405 to await the next beacon reception. If the time has exceeded the UpdatePeriod preset value from step 400, then in step 445 the latest AverageRSSI value from step 440 is converted to received signal strength. This conversion in step 445 will be implementation dependent as the actual conversion from RSSI value to equivalent signal strength value may differ for different devices and different manufacturers. Suffice it to say, that the output of step 445 is a signal level value that represents the average signal strength of the received beacons during a time period of UpdatePeriod as set in step 400. In step 450, the value of the Margin, preset in step 400, is deducted from the average signal strength of the received beacons derived during the latest time period of UpdatePeriod, in order to produce a value for receive sensitivity, RX_Sensitivity. In step 455 the latest value for RX_Sensitivity is checked against the value of Min_RX_sensitivity which was preset in step 400. If the value of RX_Sensitivity exceeds Min_RX_sensitivity then the time is reset to zero in step 475 and the flow returns to step 405 to await the next beacon reception. If the value of RX_Sensitivity is less than Min_RX_sensitivity then value of RX_Sensitivity is set to be equal to Min_RX_sensitivity. The time is then reset to zero in step 475 and the flow returns to step 405 to await the next beacon reception. In order to account for missed beacons, if at step 465 the BeaconCount exceeds the BeaconCountLimit, preset in step 400, then in step 470 the existing value for AverageRSSI, as determined from a previous step 435, is decremented by a value equal to RSSI_Decrement. RSSI_Decrement is a value preset in step 400. This new value is then applied to step 445 so that a new RX_Sensitivity threshold at step 450 is derived immediately.

The normal flow is that the DSC STA receives Beacon in step 410 and records the corresponding RSSI value in step 420. It is then checked, in step 425, if this RSSI value represents a value higher than the Upper Limit the value is recorded as the RSSI equivalent to the Upper Limit. The DSC STA then waits for the next Beacon. Over a period set by UpdatePeriod, the AverageRSSI can be calculated using a variety of averaging methods. An example calculation of the AverageRSSI using a moving average is:

$$AverageRSSI=[RSSI(latest)-RSSI(previous)]/3+RSSI(previous)$$

The result of such a moving average calculation is that the average RSSI value is more influenced by the latest reading than previous ones. A simple average may be used or the latest value could be used and no averaging carried out.

Once the UpdatePeriod has expired, in step 440, the AverageRSSI value is converted to received signal strength in step 445. The corresponding RX_Sensitivity Threshold is then calculated in step 450 by effectively subtracting the Margin value from the average value from step 445, and then checking, in step 455 that it is not less than the minimum RX_Sensitivity. The routine is then repeated for the next UpdatePeriod.

The routine accounts for missed beacons in steps 410, 460, 465 and 470. It is relatively common to miss a certain number of beacons especially if the DSC STA is in power save mode. If in a power save mode, the DSC STA may deliberately sleep through a number of beacons, or it may miss a beacon due to an error in timing, and hence the beacon period used in step 405 and the UpdatePeriod used in step 440 may need to be adjusted to account for this. Beacons could also be missed if the DSC STA suddenly experiences an increase in propagation loss, such as moving to the other side of a brick wall. If an expected Beacon is missed in step 410, then the BeaconCount is incremented in step 460. The BeaconCount is incremented for each successive beacon loss but reset to zero in step 415 if a beacon is received. If the BeaconCount exceeds the BeaconCountLimit, as checked in step 465, then the AverageRSSI value is instantly decremented by the value of RSSI_Decrement in step 470. This instantly increases the sensitivity of the DSC STA, via steps 445, 450, 455 and 457 to counter the perceived drop in signal strength of the received beacon. RX_Sensitivity will swiftly drop to the minimum value, Min_RX_Sensitivity, if successive beacons are still missed. Other routines that are apart from DSC take place if no Beacons are received by a STA for a certain period.

In the embodiment described in FIG. 9, beacons are used to calculate the received signal strength. Beacons provide a regular, known signal but any received signal from the AP, or indeed other STAs in the network, could be used to determine the CCA threshold value. Sampling and averaging the received signal strength over a set period, UpdatePeriod, is used as indoor radio propagation losses can vary significantly with small changes in time and position.

Together, the preset values for Upper Limit and the Margin set the minimum value for the RX_Sensitivity Threshold and sets the effective area within which all DSC STAs in the network will contend in the normal manner. This area is referred to as the contention area.

If the Margin is set to M dB, then the DSC STA will receive signals from a STA that is outside the contention area at a level that is at least M dB less than the DSC STA receives signals from its AP. It is desirable that the STA communicate with the AP at the highest practical data rate and to do this the ratio between the wanted and unwanted signals, the SNIR, should be a value that corresponds to the required SNIR for modulated signals of interest. The Margin represents the minimum value for SNIR caused by interfering STAs. Hence, by setting the Margin to 20 dB, for example, the SNIR would be effectively set to ensure that wanted signals with modulation 16-QAM and 3/4 coding would be received. The RX_Sensitivity Threshold is updated every UpdatePeriod and therefore the Margin value sets a limit to the variation in signal strength for the DSC STA within the update period. Hence the Margin needs to be large enough to cater for any sudden changes in signal strength that may be experienced such as, for example, moving behind a wall or going outside a building.

Figure 10:
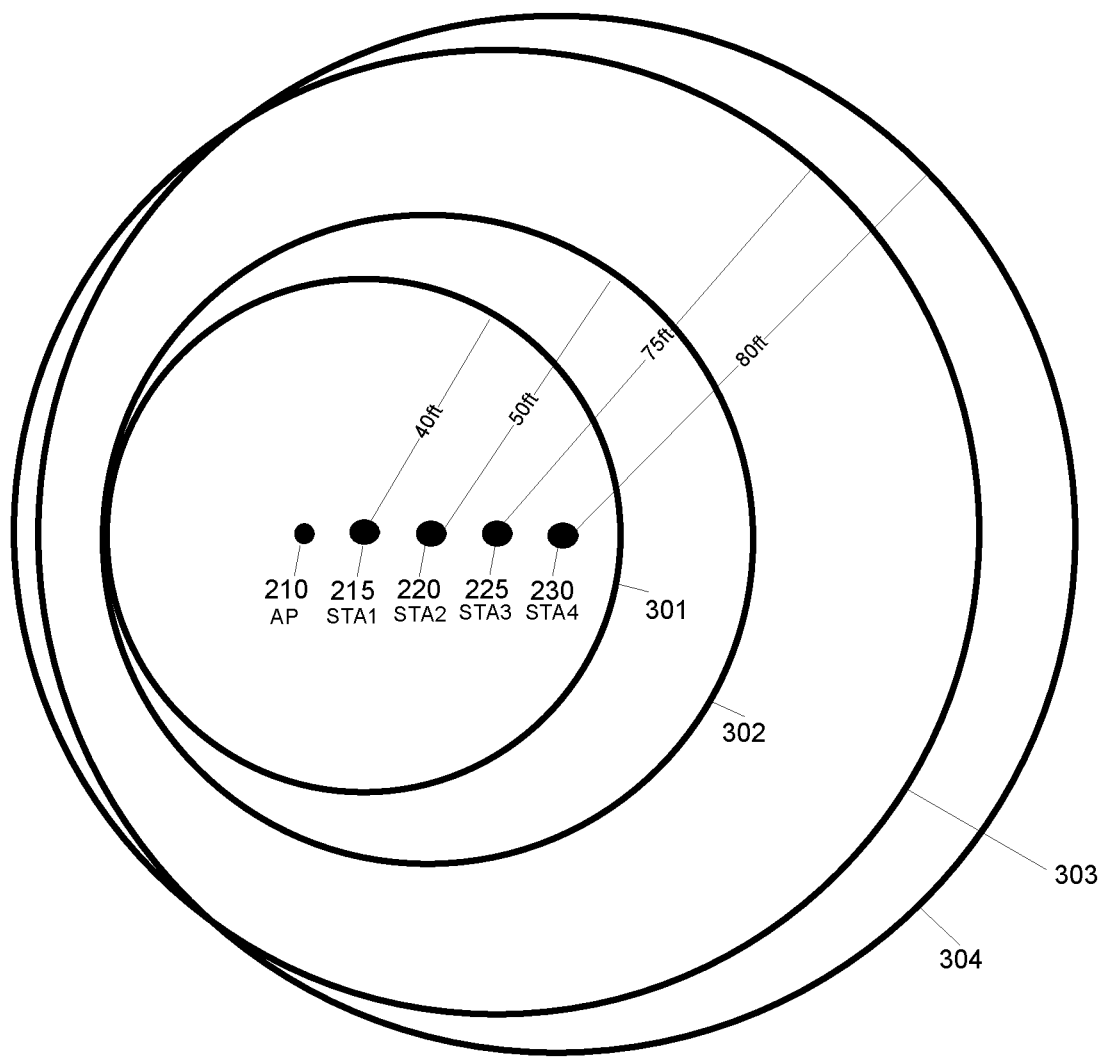
FIG. 10 is a schematic diagram that illustrates effective contention areas when using DSC with UL set to −30 dBm and M set to 20 dB according to an embodiment of the invention.

FIG. 10 is a schematic diagram that illustrates the effective contention areas when using DSC with Upper Limit, UL, set to −30 dBm and Margin, M, set to 20 dB. The Ecerg propagation formula is used to estimate ranges together with an assumption of an obstruction loss of 3 dB every 20 feet of distance. This 3 dB obstruction loss is representative of an internal wall every 20 feet. STA 1, 215, is located 10 feet away from the AP 210. At this range the received signal strength at STA 1, 215, of a beacon from the AP 210 is in the order of −28 dBm. Hence the RX_Sensitivity Threshold for STA 1, 215, would be set UL minus M, which would be −50 dBm, in this example. For indoor propagation, the equivalent range for −50 dBm signal strength is about 40 feet. The area 301 shows the effective contention area for STA 1, 215. All STAs within this area 301 would contend. Note that this 40 feet radius area 301 would generally be sufficient to cover an apartment or small house. STA 2, 220 is located 20 feet from the AP 210. In this case the received signal strength at STA 2, 220, of a beacon from the AP 210 is in the order of −40 dBm. Hence the RX_Sensitivity Threshold for STA 2, 220, would be set to the −40−20=−60 dBm resulting in the contention area 302, a circle of 50 feet radius. Similarly, STA 3, 225 is at range 30 feet from AP 210 and STA 4, 230 is located 40 feet away from AP 210. The received signal strengths of beacons from AP 210 for STA 3, 225, and STA 4, 230 are about −50 dBm and −53 dBm, which result in values for RX_Sensitivity Thresholds of −70 dBm and −73 dBm respectively. The resulting contention areas, 303 and 304, are shown as circles of radius 75 feet, and 80 feet respectively. Note that as a STA moves further away from the AP 210 the contention area increases but that area always includes the area for the STA that is closest, STA 1, 215, in this case. As the contention area 301 for STA 1, 215, is set by the value of UL minus M, this represents the smallest contention area that is possible in this network. Hence, contention areas 302, 303 and 304 all include area 301. Therefore, if the required range of the network in this example was 40 feet, then all STAs within that network will contend normally.

Figure 11:
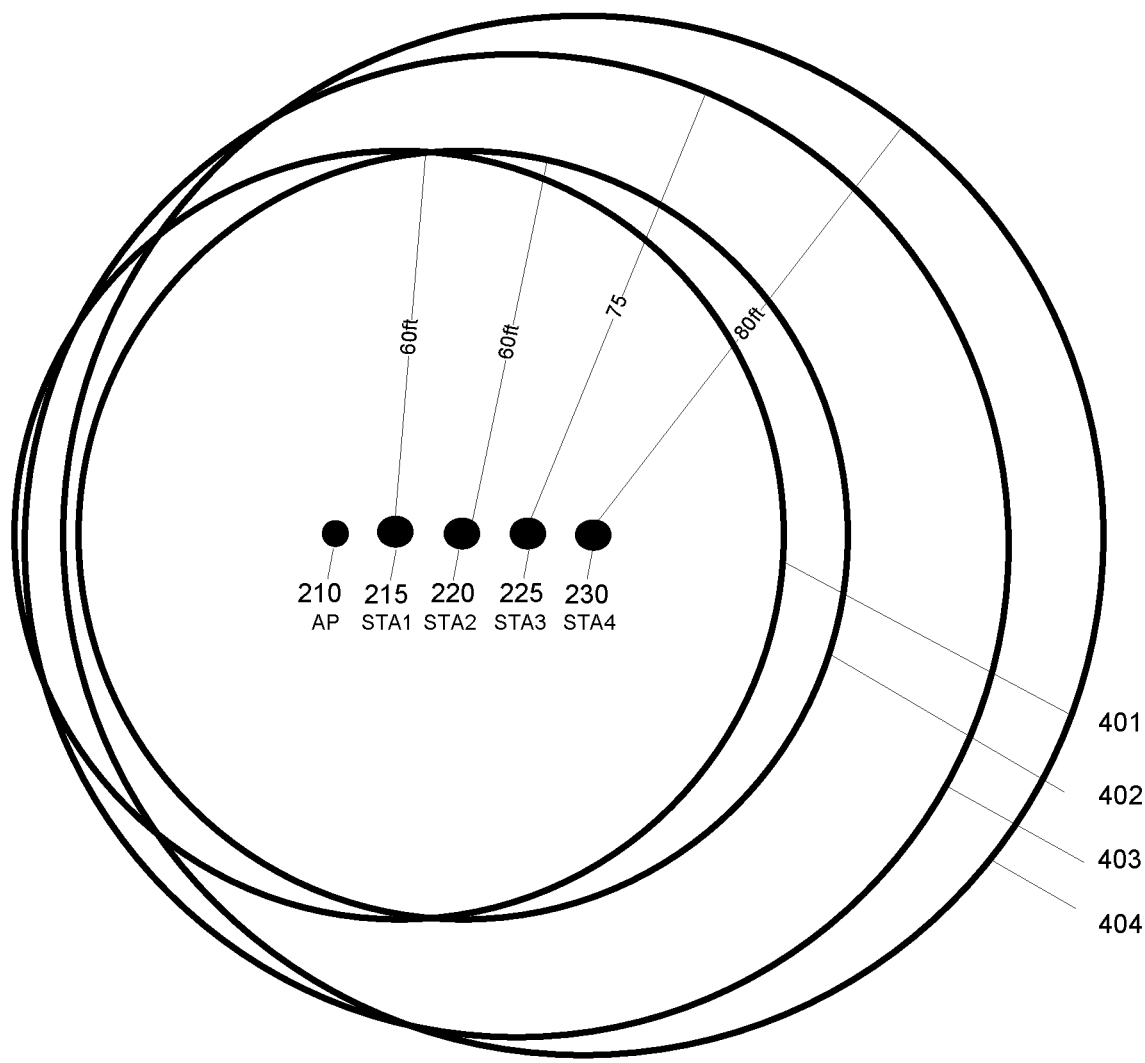
FIG. 11 is a schematic diagram that illustrates the effective contention areas when using DSC with UL set to −40 dBm and M set to 20 dB according to an embodiment of the invention.

FIG. 11 is a schematic diagram that illustrates the effective contention areas when using DSC with UL set to −40 dBm and M set to 20 dB. The Ecerg propagation formula is used to estimate ranges together with an assumption of an obstruction loss of 3 dB every 20 feet of distance. This 3 dB obstruction loss is representative of an internal wall every 20 feet. STA 1, 215, is located 10 feet away from the AP 210.

At this range the received signal strength at STA 1, 215, of a beacon from the AP 210 is in the order of −28 dBm. Hence the RX_Sensitivity Threshold for STA 1, 215, would be set to the UL minus M which would be −60 dBm. For indoor propagation, the equivalent range for −60 dBm signal strength is about 60 feet. The area 401 shows the effective contention area for STA 1, 215. All STAs within this area 401 would contend using the standard routines defined in IEEE 802.11. STA 2, 220 is located 20 feet from the AP 210. In this case the received signal strength at STA 2, 220, of a beacon from the AP 210 is in the order of −40 dBm. Hence the RX_Sensitivity Threshold for STA 2, 220, would be set again to the −40−20=−60 dBm resulting in the contention area 402, a circle of 60 feet radius centered on STA 2, 220. STA 3, 225 is at range 30 feet from AP 210 and STA 4, 230 is located 40 feet away from AP 210. The received signal strengths of beacons from AP 210 for STA 3, 225, and STA 4, 230 are about −50 dBm and −53 dBm, which result in values for RX_Sensitivity Thresholds of −70 dBm and −73 dBm respectively. The resulting contention areas, 403 and 404, are shown as circles of radius 75 feet, and 80 feet respectively. In this example, as shown in FIG. 11, by using a higher value for the upper limit, the network coverage area, as represented by the common overlapping area, is increased from that in FIG. 10.

Figure 12:
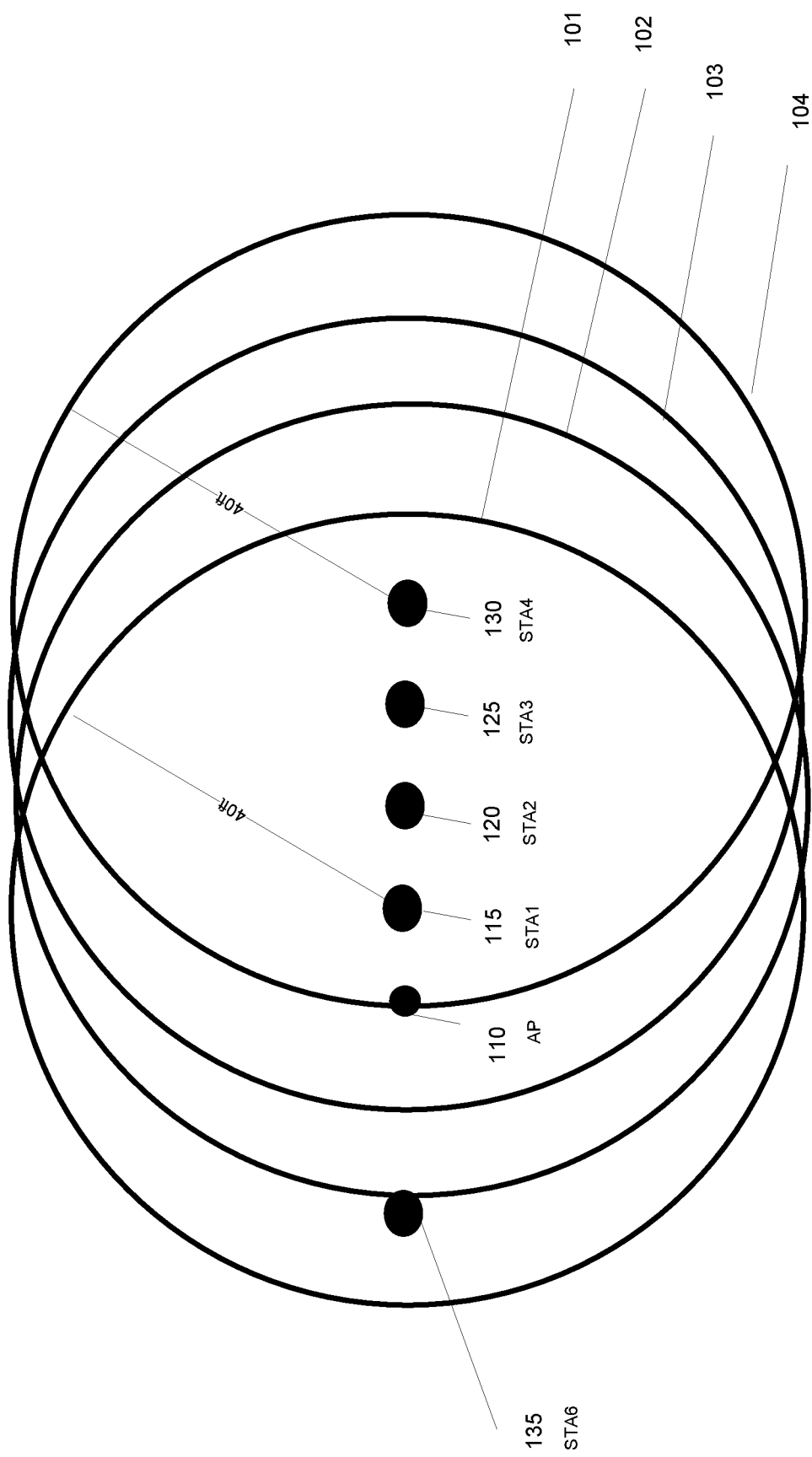
FIG. 12 is a schematic diagram that illustrates the effective contention areas when using a fixed value for CCA threshold.

FIG. 12 is a schematic diagram that illustrates the effective contention areas when using a fixed value for CS/CCA threshold. In this example, a fixed CS/CCA threshold of −50 dBm is used so that the contention areas in FIG. 12 can be directly compared to those in FIG. 10. STA 1, 115, is located 10 feet away from the AP 110. The CS/CCA threshold is fixed at −50 dBm. For indoor propagation, the equivalent range for −50 dBm signal strength is about 40 feet. The area 101 shows the effective contention area for STA 1, 115. All STAs within this area 101 would contend using the standard routines defined in IEEE 802.11. STA 2, 120 is located 20 feet from the AP 110. Again the CS/CCA threshold is set at −50 dBm resulting in the contention area 102, also a circle of 40 feet radius, but this circle is centered on STA 2, 120. Similarly, STA 3, 125 is at range 30 feet from AP 110 and STA 4, 130 is located 40 feet away from AP 110. The CS/CCA threshold is fixed at −50 dBm for each STA hence the resulting contention areas, 103 and 104, are shown as circles of radius 40 feet, centered on STA 3, 125 and STA 4, 130 respectively. STA 5, 135 is located at about 20 feet distance from AP 110 but on the opposite side to STA 1, 115. Note that STA 5, 135 does not lie within the areas of contention, 102, 103, and 104, for STA 2, 120, STA 3, 125, and STA 4, 130 respectively. Hence, STA 5, 135, will be hidden from STA 2, 120, STA 3, 125 and STA 4, 130. In this case the contention within this network would be severely impaired. FIG. 12 demonstrates that using a fixed higher level value than the default value for CS/CCA threshold does not provide the network area coverage to allow contention to take place. In contrast, FIG. 11 demonstrates that deriving the CS/CCA threshold using received signal strength together with an upper limit and margin, does provide network coverage.

Figure 13:
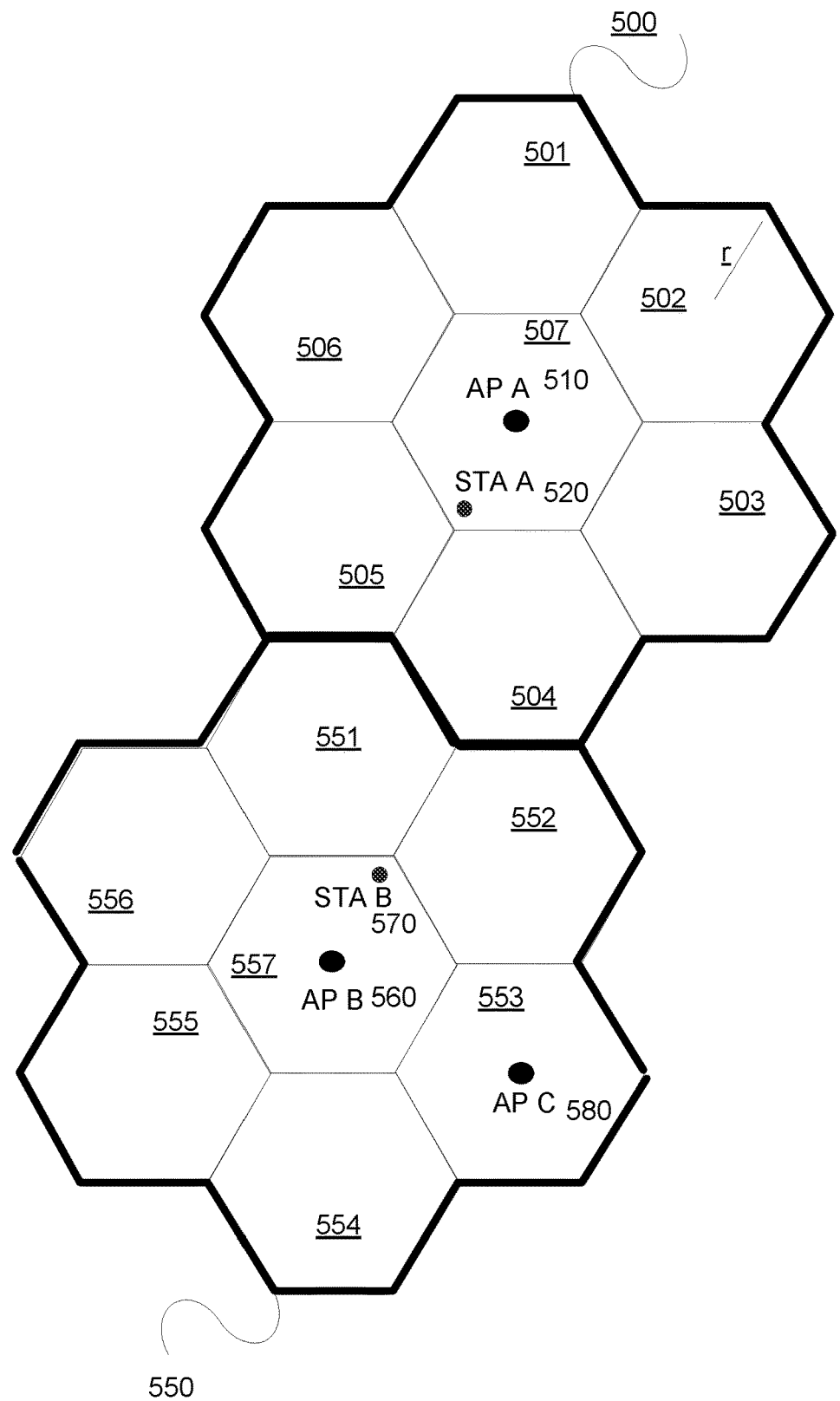
FIG. 13 is a schematic diagram showing two seven segment cell clusters according to an embodiment of the invention.

FIG. 13 is a schematic diagram showing two seven segment cell clusters, 500 and 550. Area 500 consists of seven cells, 501, 502, 503, 504, 505, 506 and 507. Area 550 consists of seven cells, 551, 552, 553, 554, 555, 556 and 557. At the center of cell 507 is located AP A, 510. At the edge of cell 510 is located STA B, 520. Similarly, in cell 557, AP B, 560 is located at the center and STA B, 570 is located at the edge of cell 570. STA A, 520 and STA B, 570 are located so as to be as close to each other as possible while remaining in their respective cells, 507 and 557. AP C, 580 is located at the center of cell 553. Assuming that the radius of each cell is r, then using standard geometry the distance between STA A, 520 and STA B, 570 is 2.64r. The distance between AP A, 510, and STA A, 520 is r. Assuming propagation loss due to distance as 35 log(d), where d is the distance, and assuming an additional obstruction loss of 3 dB per cell wall, then STA A, 520 will receive transmissions from STA B, 570 at a level equal to −(35 log(2.64)+9)=−24 dB relative to a signal from AP A, 510. Similarly, STA B, 570 will receive transmissions from STA A, 520 at a level −24 dB relative to the signal received from AP B, 560. Hence, if DSC is used with a margin of 20 dB, STA A, 520 and STA B, 570 will not exert CCA on each other and will be able to transmit simultaneously. For example, assume that the cell radius r is 40 feet. STA A, 520 is at a distance of 40 feet from AP A, 510 and hence, using the Ecerg formula for radio propagation, STA A, 520 will receive signals from AP A, 510 at a signal level of about −50 dBm. STA A, 520 is at a distance of 106 feet from STA B, 570 and hence will receive signals from STA B, 570 at a signal strength of about −75 dBm, assuming an additional obstruction loss of 3 dB per cell wall. Using a DSC scheme with a margin, M, of 20 dB, the receive sensitivity threshold and the effective CS/CCA threshold for STA A, 520 will be −70 dBm. Hence, any transmission from any STA that is within cell 557 will not exert CCA on any STA that is within cell 507. Therefore, if there are at least seven channels available, using DSC, a seven cell cluster area coverage scheme can be configured. Note, however, that using the default value for CS/CCA threshold of −82 dBm, using the same channel for the networks in cells 507 and 557 would mean that the two networks would overlap and have to share and contend. The distance between AP C, 580 and AP A, 510 is 240 feet. Transmissions from AP A, 510 will be received by AP C, 580 at a signal strength of about −81 dBm which means that if using the default value for CS/CCA threshold of −82 dBm, cells 507 and 553 would overlap and contend.

Figure 14:
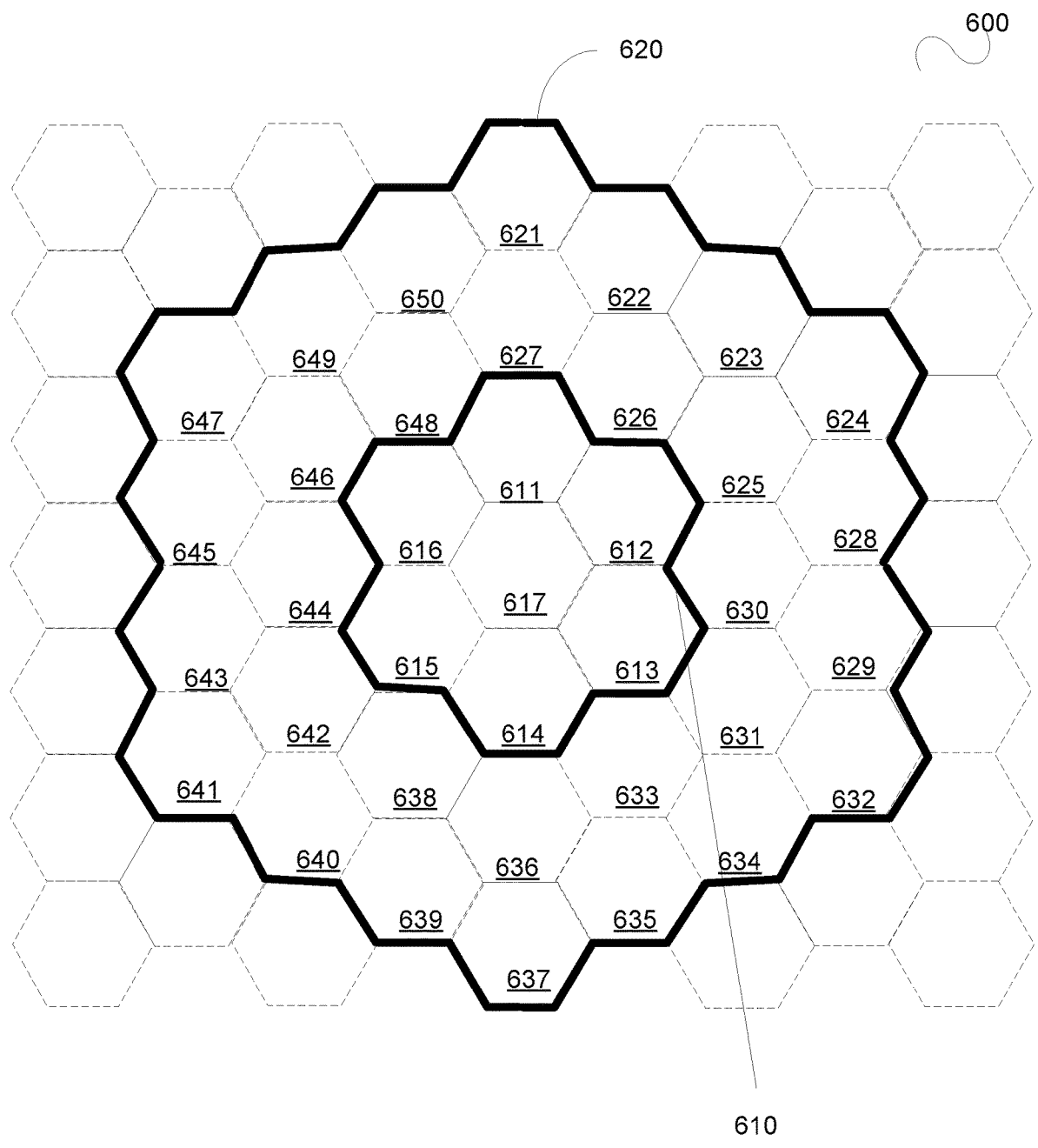
FIG. 14 is a schematic diagram of an area that includes a number of cells according to an embodiment of the invention.

FIG. 14 is a schematic diagram of an area 600 which is comprised of a number of cells. Area 610 comprises seven cells 611-617 and area 620 comprises cells 611-617 and cells 621-650, a total of 37 cells. Area 610 represents a seven segment cell cluster.

As was shown in FIG. 13, when using the DSC scheme with a margin, M, of 20 dB, it is possible to configure a seven cell cluster pattern using seven channels. Hence, in the 37 cells represented by area 620, with seven or more available channels, it is possible that every cell can be a separate network that does not overlap or share with any other network in any other cell.

If the default value for CCA threshold is used, then every other cell within the area 620 would overlap and contend with cell 617. Hence, the result is that using DSC there are 37 separate networks, whereas with the default CS/CCA threshold there are 37 overlapping networks to cell 617. To estimate the capacity improvement the following simplified calculation is given. Assume that the maximum throughput in each cell network is T Mbps.

The total throughput capacity using DSC is simply 37×T Mbps as each cell has its own channel, one chosen from a pool of 7 channels. In the case where default CS/CCA threshold is used, it would be possible to use 7 APs in the center of cell 617, but the complete 37 cells area is effectively one network, so hence the maximum throughput would be 7×T Mbps. Therefore using DSC increases the total area throughput of area 620 by a factor of at least 37/7=5.29. In fact, it can be shown that due the fact that in area 620, using the fixed CS/CCA threshold of −82 dBm, there are many hidden cells, the improvement in total throughput by using DSC is higher and at least 8 times. For example, when using the fixed default CS/CCA, the STAs in cells 621, 622, 623, 626, 627, 638, 639, 640, 641, 642, 643, 644, 645, 646, 647, 648, 649, and 650, would all be hidden from the STAs in cell 632; a total of 18 out of the 37 cells. Similarly, for every cell there will be hidden cells, and the overall result is that the efficiency of the complete 37 cell network is impaired.

As shown in FIG. 13 and FIG. 14 if DSC is adopted, the overall throughput for a particular area can be significantly improved because the re-use pattern of channels is improved and more simultaneous transmissions can take place within the total area.

The AP can set the Upper Limit, U L, and Margin, M, parameters by advertising them in beacons and probe responses using an information element and by so doing set the effective operating area of its network, as was shown in FIG. 10 and FIG. 11. Also the AP can set the CCA thresholds for itself. A variety of methods could be used for the AP to determine these values, either by pre-set or by a learning process. For example an AP could discover the channel and overlapping situation by monitoring the beacons and traffic from surrounding networks. This process could be dynamic with subsequent scans of the medium. In general the AP setting for the CCA threshold would be set in relation with the value (UL−M), where UL and M are the values that the AP might advertise.

Figure 15:
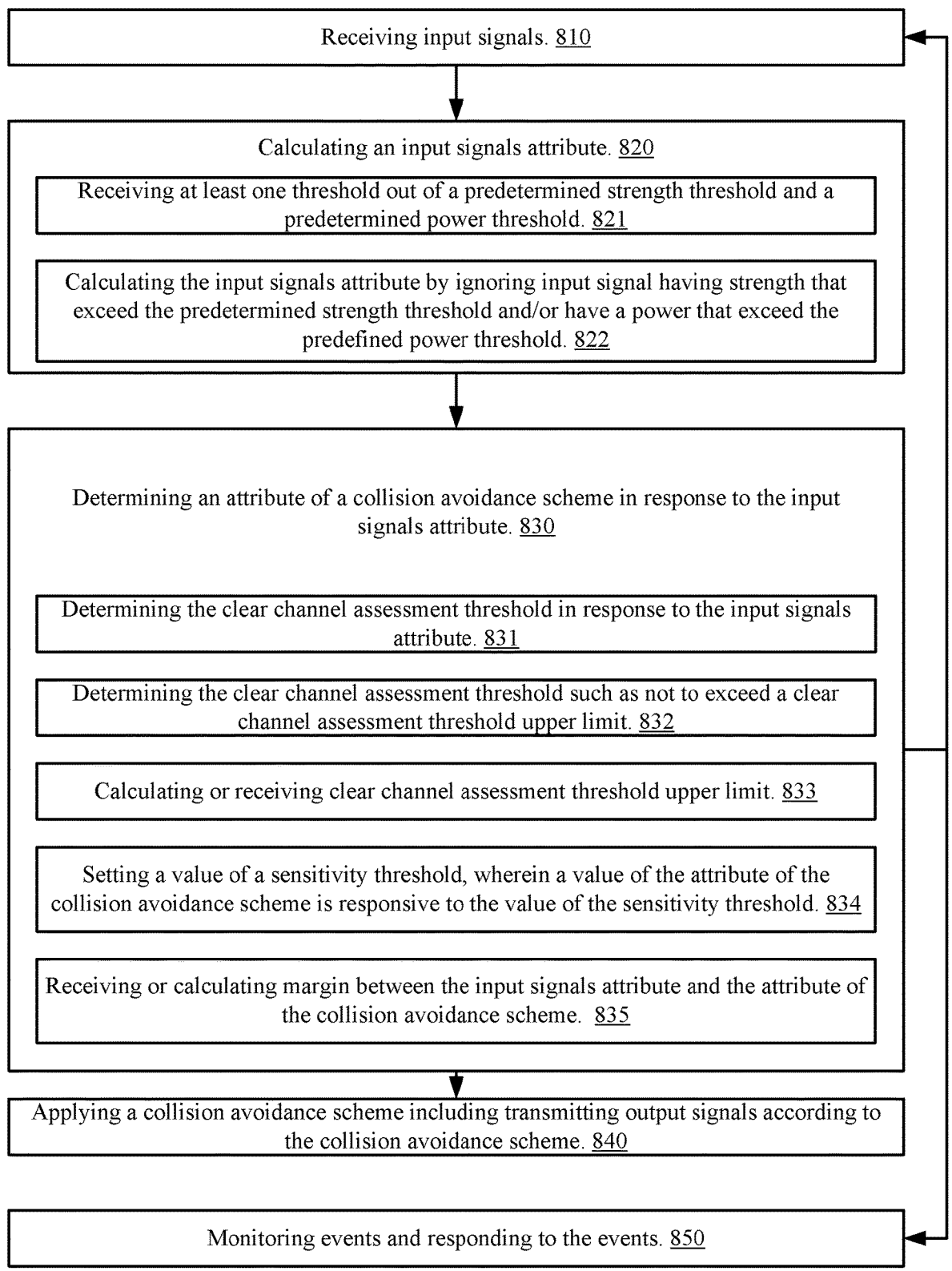
FIG. 15 is a flow chart of a method according to an embodiment of the invention.

FIG. 15 illustrates method 800 according to an embodiment of the invention. FIG. 16 illustrates stage 850 of method 800 according to an embodiment of the invention.

Method 800 may start by stage 810 of receiving input signals. These input signals are received by a wireless communication device (such as a station) and were transmitted over a wireless network. They may be transmitted by an access point associated with a wireless communication device or by another device (other station, other access point).

Stage 810 may be followed by stage 820 of calculating an input signal's attribute.

The calculating of the input signal's attribute may be responsive to all or some of the input signals received by the wireless communication device, to all or some of the input signals received from an access point associated with the wireless communication device, to some or all input signals received from an entity that differs from the access point associated with the wireless communication device, to all or some of the input signals included in data frames, to all or some of the input signals included in beacon frames, to all or some of the input signals included in probe responses, to all or some of the input signals included in management frames, to all or some of the input signals included in input signals that are included in frames of predetermined power and timing, to all or some of the input signals included in one or more time windows and the like.

The input signal's attribute may represent at least one of a strength and power of the input signals.

The input signal's attribute may represent at a statistical function applied on values of input signals over a time period.

Stage 820 may include:
a. Stage 821 of receiving at least one threshold out of a predetermined strength threshold and a predetermined power threshold. This stage may include searching the at least one threshold in any frame received by the wireless communication device, in some or any frame received from an access point associated with the wireless communication device, in some or any frame received from an entity that differs from the access point associated with the wireless communication device, in some or any data frame, in some or any beacon frame, in some or any probe responses, in some or any management frames, in some or any frames of predetermined power and timing, in some or any frames received in one or more time windows and the like.
b. Stage 822 of calculating the input signals attribute by ignoring input signal having strength that exceed the predetermined strength threshold and/or have a power that exceed the predefined power threshold.

Stage 820 may be followed by stage 830 of determining an attribute of a collision avoidance scheme in response to the input signals attribute.

The attribute of the collision avoidance scheme may be a clear channel assessment threshold.

Stage 830 may include at least one of the following stages:
a. Stage 831 of determining the clear channel assessment threshold in response to the input signals attribute.
b. Stage 832 of determining the clear channel assessment threshold such as not to exceed a clear channel assessment threshold upper limit.
c. The clear channel assessment threshold upper limit may be fixed, may vary over time, may be determined by the wireless communication device, by an associated access point and the like. Stage 830 may include stage 833 of calculating or receiving the clear channel assessment threshold upper limit. Stage 833 may include searching the clear channel assessment threshold upper limit in frames from an access point that is associated with the wireless communication device. These frames may be beacon frames, management frames and/or probe responses.
d. Stage 834 of setting a value of a sensitivity threshold, wherein a value of the attribute of the collision avoidance scheme is responsive to the value of the sensitivity threshold.
e. Stage 835 of receiving or calculating margin between the input signals attribute and the attribute of the collision avoidance scheme. If the margin is received then stage 835 may include searching the margin in frames from an access point that is associated with the wireless communication device. These frames may be beacon frames, management frames and/or probe responses.

Stage 830 may be followed by stages 840, 850 and 810. Jumping from stage 840 to stage 810 facilitates a repetition of stages 810-830 and provides a dynamic process for determining the attribute of the collision avoidance scheme.

Stage 840 may include applying a collision avoidance scheme. This may include transmitting output signals according to the collision avoidance scheme.

The repetition of stages 810-840 may result in calculating the clear channel assessment threshold upper limit at different points of time.

Stage 850 may include monitoring events and responding to the events.

Stage 850 may include at least one out of the following stages, all illustrated in FIG. 16:
a. Stage 851 of monitoring a lack of reception of input frames that were expected to be received by the wireless communication device. The input frames that were expected to be received by the wireless communication device may be beacon frames.

b. Stage 852 of updating the attribute of the collision avoidance scheme in response to the lack of reception of input frames that were expected to be received by the wireless communication device. The input frames that were expected to be received by the wireless communication device may be beacon frames.

c. Stage 853 of reducing the receive sensitivity threshold and possibly the effective clear channel assessment threshold, if the receive sensitivity threshold is still higher than the clear channel assessment threshold, upon a lack of reception of a predetermined number of successive beacon frames that were expected to be received by the wireless communication device.

d. Stage 854 of reducing the receive sensitivity threshold and possibly the effective clear channel assessment threshold, if the receive sensitivity threshold is still higher than the clear channel assessment threshold, upon a predefined relationship between beacon frames that were received by the wireless communication device and beacon frames that were expected to be received by the wireless communication device but were not received by the wireless communication device.

e. Stage 855 of reducing, by a certain amount, the receive sensitivity threshold and possibly the effective clear channel assessment threshold, if the receive sensitivity threshold is still higher than the clear channel assessment threshold, upon a lack of reception of at least one input frame that was expected to be received by the wireless communication device; wherein the certain amount is fixed.

f. Stage 856 of reducing, by a certain amount, receive sensitivity threshold and possibly the effective clear channel assessment threshold, if the receive sensitivity threshold is still higher than the clear channel assessment threshold, upon a lack of reception of at least one input frame that was expected to be received by the wireless communication device; wherein the certain amount varies over time.

FIG. 17 illustrates method 900 according to an embodiment of the invention Method 900 may include stage 910 of measuring, by a wireless communication device, an attribute of transmissions of another wireless communication device. Stage 910 may be followed by stage 920 of determining the attribute of the collision avoidance scheme in response to an attribute of the transmissions of the other wireless communication device.

The wireless communication device may be an access point. The network communication device and the other wireless communication device may belong to different wireless networks. The network communication device and the other wireless communication device may belong to a same wireless network.

The attribute of the collision avoidance scheme may be a clear channel assessment threshold upper limit. The attribute of the collision avoidance scheme may be at least one margin between an input signals attribute and another attribute of the collision avoidance scheme.

Stage 920 may be followed by stage 930 of transmitting the attribute of the collision avoidance scheme to a further wireless communication device.

Figure 18:
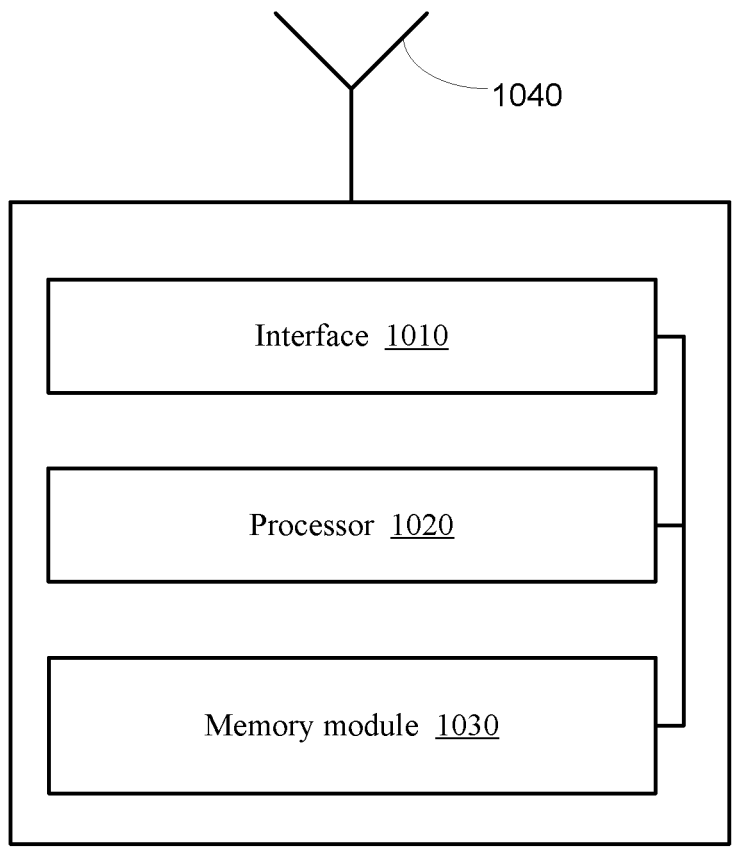
FIG. 18 illustrates a wireless communication device according to an embodiment of the invention.

FIG. 18 illustrates a wireless communication device 1000 according to an embodiment of the invention.

The wireless communication device may be any device capable of wirelessly receiving and/or wirelessly transmitting signals and can execute any of the methods illustrated in the specification. It may be a station, an access point, and the like.

The wireless communication device 1000 includes interface 1010, processor 1020, memory module 1030 and one or more wireless antennas such as wireless antennas 1040. The interface 1010 may be a wireless receiver, a wireless transmitter, a combination thereof or a portion thereof. It may include, for example, at least a part of an analog and/or digital front end of a receiver, a transmitter or a combination thereof.

The interface 1010 and/or the processor 1020 may include measurement elements for measuring and/or calculating attributes of received signals (input signals, transmissions).

According to an embodiment of the invention the interface 1010 is arranged to receive input signals and the processor 1020 is arranged to calculate an input signal's attribute; and determine an attribute of a collision avoidance scheme in response to the input signal's attribute. The memory module may store instructions for executing any method mentioned in the specification, input signals, results of processing of the processor 1020, signals to be outputted and the like.

According to an embodiment of the invention the interface 1010 is arranged to receive transmissions of another wireless communication device and the processor 1020 is arranged to measure an attribute of the transmissions of the other wireless communication device, and determine the attribute of the collision avoidance scheme in response to an attribute of the transmissions of the other wireless communication device.

According to an embodiment of the invention the interface 1010 is arranged to receive input signals and the processor 1020 is arranged to calculate an input signal's attribute; and determine at least one out of a sensitivity threshold and a clear channel assessment threshold; wherein a value of the clear channel assessment threshold is responsive to a value of the sensitivity threshold.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for determining an attribute of a carrier sense multiple access with collision avoidance (CSMA/CA) scheme, the method comprises:
   receiving, by an interface of a wireless communication device, an input signal;
   calculating, by a processor of the wireless communication device, a strength of the input signal; and
   determining, by the processor, the attribute of the (CSMA/CA) scheme in response to the strength of the input signal; wherein the attribute of the CSMA/CA scheme is a clear channel assessment threshold indicative of a received signal level for clear channel assessment to be exerted;
   counting a number of successive missed beacon frames;
   defining a limit for a number of successive missed beacon frames; and
   reducing the clear channel assessment threshold when the number of successive missed beacons exceeds the limit.

2. The method according to claim 1 wherein the input signal is a management frame that is transmitted by an access point to which the wireless communication device is associated.

3. The method according to claim 1 wherein the input signal is a beacon frame that is transmitted by an access point to which the wireless communication device is associated.

4. The method according to claim 1 wherein the determining of clear channel assessment threshold is responsive to the strength of the input signal when the strength of the input signal does not exceed an upper limit.

5. The method according to claim 1 wherein the determining of clear channel assessment threshold comprises determining the clear channel assessment threshold such as not to exceed a clear channel assessment threshold upper limit.

6. The method according to claim 5 wherein the clear channel assessment threshold upper limit is fixed.

7. The method according to claim 5, comprising determining the clear channel assessment threshold upper limit by the wireless communication device.

8. The method according to claim 5, comprising changing the clear channel assessment threshold upper limit over time.

9. The method of claim 5, comprising searching the clear channel assessment threshold upper limit in frames from an access point that is associated with the wireless communication device.

10. The method according to claim 1 comprising setting the clear channel assessment threshold to a level that is equal to the strength of the input signal minus a margin.

11. The method of claim 1 comprising calculating the strength of the input signal by averaging strengths of input signals that were calculated at different points in time within a time period.

12. A method for determining an attribute of a carrier sense multiple access with collision avoidance (CSMA/CA) scheme, the method comprises:
   receiving, by an interface of a wireless communication device, an input signal;
   calculating, by a processor of the wireless communication device, a strength of the input signal wherein the calculating comprises averaging strengths of input signal that were calculated at different points in time within a time period;
   determining, by the processor, the attribute of the (CSMA/CA) scheme in response to the strength of the input signal; wherein the attribute of the (CSMA/CA) scheme is a receive sensitivity threshold;
   setting the receive sensitivity threshold to a level that is equal to the strength of the input signal minus a margin;
   counting a number of successive missed beacon frames;
   defining a limit for a number of successive missed beacon frames; and
   reducing the receive sensitivity threshold when the number of successive missed beacons exceeds the limit.

13. A wireless communication device that comprises an interface and a processor;
   wherein the interface is arranged to receive an input signal;
   wherein the processor is arranged to:
   calculate a strength of the input signal; and
   determine an attribute of a carrier sense multiple access with collision avoidance (CSMA/CA) scheme in response to the strength of the input signal; wherein the attribute of the CSMA/CA scheme is a clear channel assessment threshold indicative of a received signal level for clear channel assessment to be exerted;
   count a number of successive missed beacon frames;
   define a limit for a number of successive missed beacon frames; and
   reduce the clear channel assessment threshold when the number of successive missed beacons exceeds the limit.

14. The wireless communication device according to claim 13 comprising a transmitter, wherein the transmitter is arranged to transmit output signals according to the clear channel assessment threshold.

15. The wireless communication device according to claim 13 wherein the input signal is a management frame that is transmitted by an access point to which the wireless communication device is associated.

16. The wireless communication device according to claim 13 wherein the input signal is a beacon frame that is transmitted by an access point to which the wireless communication device is associated.

17. The wireless communication device according to claim 16 wherein the processor is configured to determine the clear channel assessment threshold in response to the strength of the input signal when the strength of the input signal does not exceed an upper limit.

18. The wireless communication device according to claim 17 wherein the processor is configured to determine the clear channel assessment threshold such as not to exceed a clear channel assessment threshold upper limit.

19. The wireless communication device according to claim 18 wherein the processor is configured to set the clear channel assessment threshold to a level that is equal to the strength of the input signal minus a margin.

20. The wireless communication device according to claim 18 wherein the clear channel assessment threshold upper limit is fixed.

21. The wireless communication device of claim 13 wherein the processor is configured to calculate the strength of the input signal by averaging strengths of input signals that were calculated at different points in time within a time period.

22. The wireless communication device according to claim 18, comprising changing the clear channel assessment threshold upper limit over time.

23. The wireless communication device according to claim 22 wherein the processor is configured to search the clear channel assessment threshold upper limit in frames from an access point that is associated with the wireless communication device.

24. A wireless communication device that comprises an interface and a processor; wherein the interface is arranged to receive an input signal; wherein the processor is arranged to: calculate a strength of the input signal; and determine an attribute of a carrier sense multiple access with collision avoidance (CSMA/CA) scheme in response to the strength of the input signal; wherein the attribute of the (CSMA/CA) scheme is a receive sensitivity threshold; wherein the processor is configured to set the receive sensitivity threshold to a level that is equal to the strength of the input signal minus a margin; wherein the processor is configured to calculate the strength of the input signal by averaging strengths of input signal that were calculated at different points in time within a time period; wherein the processor is configured to count a number of successive missed beacon frames; define a limit for a number of successive missed beacon frames; and reduce the attribute of the (CSMA/CA) scheme when the number of successive missed beacons exceeds the limit.

25. A non-transitory computer readable medium that stores instructions that once executed cause a wireless communication device to: receive an input signal; calculate a strength of the input signal; determine an attribute of a carrier sense multiple access with collision avoidance (CSMA/CA) scheme in response to the strength of the input signal wherein the attribute of the CSMA/CA scheme is a clear channel assessment threshold; count a number of successive missed beacon frames; define a limit for a number of successive missed beacon frames; and reduce the clear channel assessment threshold when the number of successive missed beacons exceeds the limit.

26. The non-transitory computer readable medium according to claim 25 that stores instructions for calculating the strength of the input signal by averaging strengths of input signals that were calculated at different points in time within a time period.

* * * * *

UNITED STATES PATENT AND TRADEMARK OFFICE
CERTIFICATE OF CORRECTION

| | | |
|---|---|---|
| PATENT NO. | : 10,575,330 B2 | Page 1 of 1 |
| APPLICATION NO. | : 15/420106 | |
| DATED | : February 25, 2020 | |
| INVENTOR(S) | : Graham Kenneth Smith | |

It is certified that error appears in the above-identified patent and that said Letters Patent is hereby corrected as shown below:

On the Title Page

Item (71): please delete "Graham Alxander Smith" and replace with --Graham Kenneth Smith--.
Item (72): please delete "Graham Alxander Smith" and replace with --Graham Kenneth Smith--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*